US012632385B2

(12) United States Patent
Weishaupt et al.

(10) Patent No.: US 12,632,385 B2
(45) Date of Patent: May 19, 2026

(54) COHERENT COMMUNICATION BETWEEN A PROCESSOR CORE AND AN ACCELERATOR

(71) Applicant: International Business Machines Corporation, Armonk, NY (US)

(72) Inventors: Simon Weishaupt, Kernen im Remstal (DE); Cedric Lichtenau, Stuttgart (DE); Simon Friedmann, Boeblingen (DE); Preetham M. Lobo, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 30 days.

(21) Appl. No.: 18/754,079

(22) Filed: Jun. 25, 2024

(65) Prior Publication Data

US 2025/0390433 A1     Dec. 25, 2025

(51) Int. Cl.
*G06F 12/0831* (2016.01)
*G06F 12/084* (2016.01)

(52) U.S. Cl.
CPC ........ *G06F 12/0831* (2013.01); *G06F 12/084* (2013.01); *G06F 2212/1016* (2013.01)

(58) Field of Classification Search
CPC ........... G06F 12/084; G06F 2212/1016; G06F 12/0815

(Continued)

(56) References Cited

U.S. PATENT DOCUMENTS 10,169,108 B2   1/2019  Gou et al.
11,068,397 B2   7/2021  Gou et al.
(Continued)

FOREIGN PATENT DOCUMENTS

CN        116841835 A    10/2023

OTHER PUBLICATIONS

Elliott Glenn et al., "An optimal k-exclusion real-time locking protocol motivated by multi-GPU systems", Real Time Systems, Dec. 6, 2012, pp. 140-170, vol. 49, doi: https://doi.org/10.1007/s11241-012-9170-0.
International Searching Authority, "Notification of Transmittal of the International Search Report and the Written Opinion of the International Searching Authority, or Declaration," Patent Cooperation Treaty, Aug. 1, 2025, 11 pages, International Application No. PCT/EP2025/065340.
(Continued)

*Primary Examiner* — Hashem Farrokh
(74) *Attorney, Agent, or Firm* — Amin, Turocy & Watson, LLP

(57)     ABSTRACT
One or more systems, devices, computer program products and/or computer-implemented methods of use provided herein relate to communication between a processor core and an accelerator. For example, a system can comprise a memory that can store computer executable components. The system can further comprise a processor that can execute the computer executable components stored in the memory, wherein the computer executable components can comprise a tracking component that can track a running state of an accelerator during execution of one or more functions by the accelerator. The computer executable components can further comprise an installation component that can install, via the accelerator, a message in a cache accessible to a processor core, wherein a cache line comprised within the cache can be updated based on installation of the message in the cache.

18 Claims, 15 Drawing Sheets

(58) Field of Classification Search
USPC ......................................................... 711/141
See application file for complete search history.

(56) References Cited

U.S. PATENT DOCUMENTS

| 12,026,093 | B1 * | 7/2024 | John .................... G06F 12/1009 |
|---|---|---|---|
| 2010/0198997 | A1 | 8/2010 | Archer et al. |
| 2014/0204099 | A1 | 7/2014 | Ye |
| 2016/0283240 | A1 | 9/2016 | Mishra et al. |
| 2019/0155754 | A1 * | 5/2019 | Kida ..................... G06F 21/606 |
| 2019/0188136 | A1 | 6/2019 | Shah et al. |
| 2019/0347125 | A1 * | 11/2019 | Sankaran .............. G06F 9/3858 |
| 2020/0050490 | A1 * | 2/2020 | Schardt .............. G06F 11/3419 |
| 2020/0285942 | A1 * | 9/2020 | Yan ......................... G06N 3/045 |
| 2021/0312093 | A1 | 10/2021 | Buyuktosunoglu et al. |
| 2022/0214903 | A1 | 7/2022 | Zhao et al. |
| 2023/0153168 | A1 | 5/2023 | Abali et al. |
| 2023/0409302 | A1 * | 12/2023 | Kodama ................ G06F 8/443 |
| 2024/0143758 | A1 * | 5/2024 | Yim ...................... G06F 21/565 |
| 2024/0338327 | A1 | 10/2024 | Syrivelis et al. |
| 2025/0013509 | A1 | 1/2025 | Marchand |
| 2025/0173269 | A1 | 5/2025 | Soltaniyeh et al. |

OTHER PUBLICATIONS

International Searching Authority, "Notification of Transmittal of the International Search Report and the Written Opinion of the International Searching Authority, or Declaration," Patent Cooperation Treaty, Aug. 4, 2025, 12 pages, International Application No. PCT/EP2025/065348.

M. Asri et al., "CASPHAr: Cache-Managed Accelerator Staging and Pipelining in Heterogeneous System Architecture", IEEE Transactions on Computer-Aided Design of Integrated Circuits and Systems, Nov. 2022, pp. 4325-4336, vol. 41, No. 11, doi: 10.1109/TCAD.2022.3197535.

N. Agarwal et al., "Selective GPU caches to eliminate CPU-GPU HW cache coherence", 2016 IEEE International Symposium on High Performance Computer Architecture (HPCA), Barcelona, Spain, 2016, pp. 494-506, doi: 10.1109/HPCA.2016.7446089.

United States Non-Final Rejection dated Jun. 11, 2025, 14 pages, in U.S. Appl. No. 18/754,065.

United States Notice of Allowance dated Aug. 22, 2025, 12 pages, in U.S. Appl. No. 18/754,065.

* cited by examiner

PC: PROCESSOR CORE

ACC.: ACCELERATOR

PC: PROCESSOR CORE

ACC.: ACCELERATOR

900

TRACKING, BY A SYSTEM OPERATIVELY COUPLED TO A PROCESSOR, A RUNNING STATE OF AN ACCELERATOR DURING EXECUTION OF ONE OR MORE FUNCTIONS BY THE ACCELERATOR          902

INSTALLING, BY THE SYSTEM, VIA THE ACCELERATOR, A MESSAGE IN A CACHE ACCESSIBLE TO A PROCESSOR CORE, WHEREIN A CACHE LINE COMPRISED WITHIN THE CACHE IS UPDATED BASED ON INSTALLATION OF THE MESSAGE IN THE CACHE          904

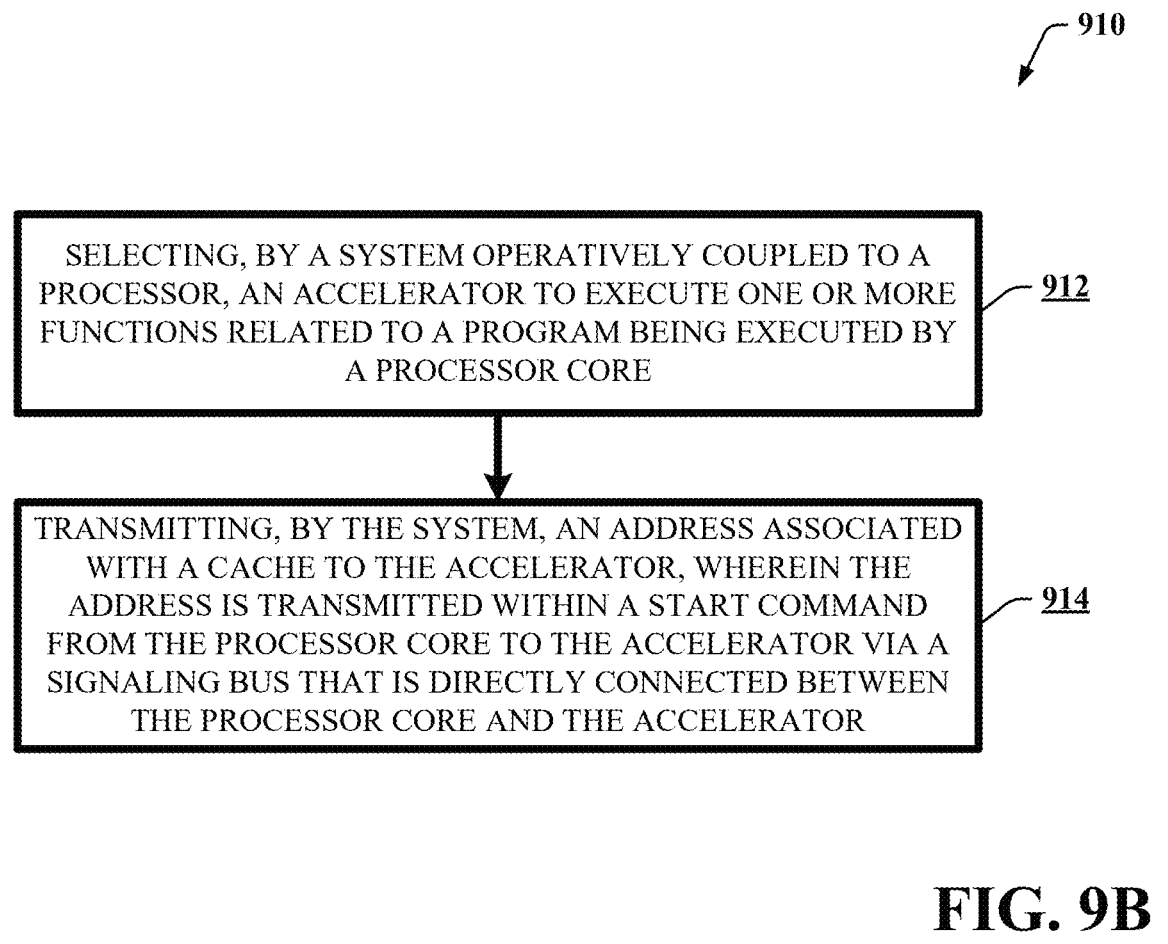

910

SELECTING, BY A SYSTEM OPERATIVELY COUPLED TO A PROCESSOR, AN ACCELERATOR TO EXECUTE ONE OR MORE FUNCTIONS RELATED TO A PROGRAM BEING EXECUTED BY A PROCESSOR CORE — 912

TRANSMITTING, BY THE SYSTEM, AN ADDRESS ASSOCIATED WITH A CACHE TO THE ACCELERATOR, WHEREIN THE ADDRESS IS TRANSMITTED WITHIN A START COMMAND FROM THE PROCESSOR CORE TO THE ACCELERATOR VIA A SIGNALING BUS THAT IS DIRECTLY CONNECTED BETWEEN THE PROCESSOR CORE AND THE ACCELERATOR — 914

FIG. 9B

COHERENT COMMUNICATION BETWEEN A PROCESSOR CORE AND AN ACCELERATOR

BACKGROUND

The present invention relates to computer processing technologies and, more specifically, to coherent and efficient communication between a processor core and an accelerator.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, methods, apparatus and/or computer program products that enable coherent messaging via intra cores, accelerators, and chips are discussed.

According to an embodiment of the present invention, a system is provided. The system can comprise a memory that can store computer executable components. The system can further comprise a signaling bus that can be directly connected between a processor core and an accelerator. The system can further comprise a processor that can execute the computer executable components stored in the memory, where the computer executable components can comprise a selection component that can select the accelerator to execute one or more functions related to a program being executed by the processor core. The computer executable components can further comprise a transmission component that can transmit an address associated with a cache to the accelerator, wherein the address can be transmitted within a start command from the processor core to the accelerator via the signaling bus.

According to various embodiments, the above-described system can be implemented as a computer-implemented method or as a computer program product.

BRIEF DESCRIPTION OF THE DRAWINGS

One or more embodiments are described below in the Detailed Description section with reference to the following drawings:

FIG. 9B illustrates a flow diagram of another example, non-limiting method that can be employed for coherent communication between a processor core and an accelerator in accordance with one or more embodiments described herein.

DETAILED DESCRIPTION

Figure 1A:
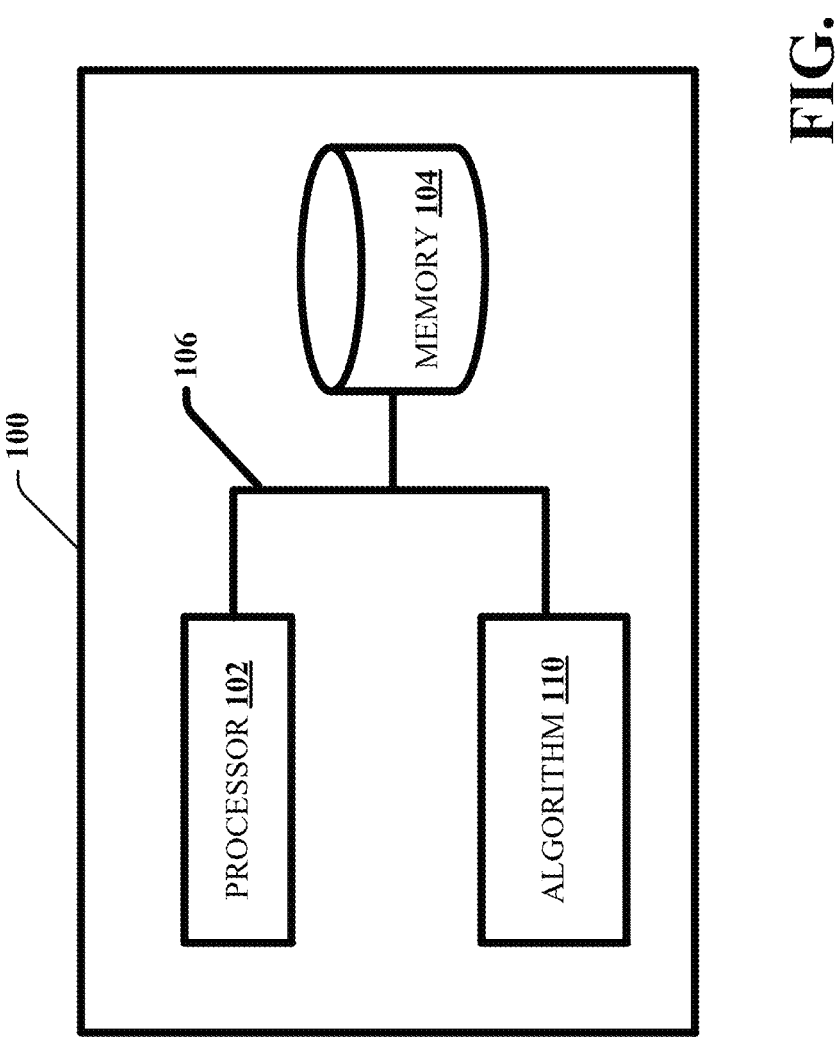
FIG. 1A illustrates a block diagram of an example, non-limiting system that can be employed to engage an accelerator to execute one or more functions for a program being executed by a processor core in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

According to an embodiment of the present invention, a system is provided. The system can comprise a memory that can store computer executable components. The system can further comprise a signaling bus that can be directly connected between a processor core and an accelerator. The system can further comprise a processor that can execute the computer executable components stored in the memory, where the computer executable components can comprise a selection component that can select the accelerator to execute one or more functions related to a program being executed by the processor core. The computer executable components can further comprise a transmission component that can transmit an address associated with a cache to the accelerator, wherein the address can be transmitted within a start command from the processor core to the accelerator via the signaling bus.

Such embodiments of the system can provide a number of advantages, including preventing cache pollution that can occur due to data transfer between the processor core and the accelerator, reducing bandwidth consumed during the data transfer, and enabling transmission of messages between multiple processor cores and accelerators without large latency impacts.

In one or more embodiments of the aforementioned system, the start command can be transmitted from the processor core to the accelerator via a sideband signaling mechanism. In an aspect, the start command can also comprise information about the one or more functions to be executed by the accelerator.

Such embodiments of the system can provide a number of advantages, including efficient used of bandwidth and improved system performance.

In one or more embodiments of the aforementioned system, the processor core can be located on a first chip, and the accelerator can be located on the first chip, on the processor core, or on a second chip that can be operatively coupled to the first chip.

Such embodiments of the system can provide the advantage of increasing the scalability of computing systems while ensuring efficient execution of computational processes.

In one or more embodiments of the aforementioned system, the accelerator can be an artificial intelligence (AI) processing unit.

Such embodiments of the system can provide the advantage of developing scalable and efficient AI-based computing systems.

In one or more embodiments of the aforementioned system, the cache can be accessible to both the processor core and the accelerator, and the address can be employable by the accelerator to install one or more messages in the cache via non-cached stores to communicate a running state of the accelerator to the processor core during execution of the one or more functions.

Such embodiments of the system can provide a number of advantages, including synchronizing the operations of the processor core and the accelerator, preventing cache pollution that can occur due to data transfer between the processor core and the accelerator, and enabling transmission of messages between multiple processor cores and accelerators without large latency impacts.

In one or more embodiments, the aforementioned system can further comprise a monitoring component that can access the one or more messages, and monitor the running state of the accelerator at the cache, based on the one or more messages.

Such embodiments of the system can provide the advantage of monitoring the running state of the accelerator at a cache local to the processor core.

In one or more embodiments, the aforementioned system can further comprise an inferencing component that can determine, based on the monitoring, whether the running state indicates an updated state of the accelerator as compared to a previously recorded running state of the accelerator. The inferencing component can further determine, based on the running state, a phase of the program being executed by the processor core. The inferencing component can further determine, based on the phase, whether the accelerator has completed execution of the one or more functions.

Such embodiments of the system can provide the advantage of capturing the running state of the accelerator and synchronizing the operations of the processor core and the accelerator.

An embodiment in which the processor core is located on the first chip, the accelerator is located on a second chip that is operatively coupled to the first chip, and the accelerator is an AI processing unit, can provide a number of advantages, including increasing the scalability of AI-based computing systems, preventing cache pollution that can occur due to data transfer between the processor core and the accelerator, and enabling transmission of messages between multiple processor cores and accelerators without large latency impacts.

In various embodiments, the above-described system can be employed to improve the overall efficiency and processing capacity of computing systems, including AI-based computing systems, wherein such computing systems can be employed for a variety of tasks such as software execution, data processing, etc.

According to various embodiments, the above-described system can be implemented as a computer-implemented method or as a computer program product.

Definition

Accelerator: A computational device that can execute certain computational processes more efficiently than a general purpose central processing unit (CPU) and in an accelerated manner.

Non-cached store: A type of data storage wherein data is directly written in a main memory and is consistently updated. Data stored via non-cached stores can be immediately available to processes or devices for executing further operations based on the data. If the cache line for the memory/memory area is not installed in the cache of any processor, a non-cached store can update the memory directly without employing the cache. However, if the cache line for the memory/memory area is installed at the cache of any processor, the non-cached store can update the cache line directly at the cache.

Sideband signaling: A communication method that can be employed to transmit auxiliary information alongside a main data stream, without significantly interfering with the main data stream.

The rise in enterprise AI, standard AI models, and increasing adoption of foundation models over time is rapidly increasing the need for more AI processing capacity and surpassing the capacity of a single processing unit or chip. In a computing system, the AI workload from all processor cores of the computing system is typically distributed across all AI processing units (also known as AI-capable processing units) in the computing system. However, communication between a processor core and an AI processing unit cannot be efficiently achieved via existing frameworks. For example, employing wires between chips can be an expensive solution, employing virtual wires across chips (System Center Operations Manager (SCOMs)) can lead to low performance of a computing system, employing cache line movement across chips can lead to high cache pollution, and executing updates at a memory without employing a cache can further lead to low performance of the computing system. Additionally, direct wires between an AI processing unit and a processor core can consume additional area and are not feasible for large systems, virtual wires (SCOM Operations) are time intensive operations and can result in a large performance degradation, and normal cache line updates can result in a "ping pong" effect as the AI processing unit can pull the cache line in a local cache of the chip where the AI processing unit resides, when storing a message and the processor core can pull the cache line back to a local cache of the processor of the processor core during the read process (i.e., cache lines can be pulled across chips). Thus, a more efficient technique for achieving communication between the AI processing unit and the processor core on a computing system can be desirable.

Various embodiments of the present disclosure can be implemented to produce a solution to such problems. Embodiments described herein include systems, methods, apparatus and/or computer program products that can enable coherent communication between a processor core and an accelerator. In various embodiments, the accelerator can be a remote AI processing unit or another type of accelerator. As such, the various embodiments herein are not limited to AI processing, and can be generally applied to any acceleration provided in a system, such as an acceleration provided by an on-core accelerator (e.g., a matrix-multiplication engine), an acceleration provided by an on-chip accelerator, or an acceleration provided by an accelerator on other chips in the system.

The various embodiments described herein can enable communication between a processor core and an accelerator, via a dedicated signaling bus and efficient in-place updates of cache lines (or cached lines) in a cache that is common to the processor core and the accelerator. For example, embodiments described herein can include systems, methods, apparatus and/or computer program products that can engage an accelerator to execute one or more functions as part of one or more programs being executed by a processor core. The processor core employing the accelerator to execute the one or more functions can transmit to the accelerator, as part of a start system operation (e.g., a start command), the address of a cache line residing in a cache accessible to the processor. The accelerator can employ the address for further communication with the processor core. For example, the accelerator can employ the address to install messages that can communicate a running state of the accelerator to the processor core. In this regard, embodiments described herein can include systems, methods, apparatus and/or computer program products that can employ the accelerator to perform in-place updates of cache lines via non-cached stores, wherein the cache lines can be comprised in a cache accessible to the processor core. The communication can be achieved without employing wires, while ensuring a fast communication between the accelerator and the processor core. Further, by employing the non-cached stores, the communication between the accelerator and the processor core can be achieved without any negative effects such as cache pollution and without additional costs. For example, employing non-cached stores can allow the accelerator to install messages into a cache line residing at a cache that can be local to the processor core (e.g., located on the same chip as the processor core), without pulling the cache line into a cache that can be local to the accelerator). The messages can be accessed by the processor core to learn about the running state of the accelerator.

More specifically, in one or more embodiments, an algorithm can select, at a processor core, an accelerator and acquire a lock for the accelerator. Thereafter, the algorithm can send a start command from the processor core to the accelerator via a dedicated signaling bus and a sideband signaling mechanism. The sideband signaling mechanism can be a System Operation that can be executed by employing a dedicated signaling bus. The dedicated signaling bus can be an existing bus that can be directly connected between the processor core and the accelerator. In an implementation, the signaling bus can also be a virtual bus that can employ an existing communication bus and that can be embedded as payload over the existing communication bus. The start command can comprise the address of a cache accessible to the processor core and information about one or more functions to be executed by the accelerator as part of a software being executed by the accelerator. In one or more embodiments, the cache can be a chip cache, a core cache or any other type of cache. Upon receiving the start command, the accelerator can begin executing the one or more functions, and during the executing, another algorithm can track a running state of the accelerator based on the data generated by the accelerator as a result of executing the one or more functions. Based on the tracking, the other algorithm can determine whether there is a change in the running state of the accelerator, and if so, the other algorithm can generate and install messages comprising information about the running state of the accelerator in the cache accessible to the processor core. The messages can be installed via non-cached stores to update a cache line in the cache. The previous algorithm can access the messages from the cache to monitor, at the processor core, the running state of the accelerator and determining, at the processor core, whether the running state reflects a new state/status or an updated state/status of the accelerator. If the cache reflects an updated state of the accelerator, the algorithm can determine whether the accelerator has finished executing the one or more functions. If the accelerator has finished executing the one or more functions, the algorithm can release the accelerator lock. In one or more embodiments, dedicated hardware comprised in the accelerator can employ the non-cached stores to install the messages in the cache line comprised in the cache without pulling the cache line into the local cache of a chip comprising the accelerator. Thus, in one or more embodiments, an algorithm employed by a processor core and another algorithm employed by an accelerator can interact with one another to enable coherent communication between the processor core and the accelerator.

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident in various cases, however, that the one or more embodiments can be practiced without these specific details.

Figure 1C:
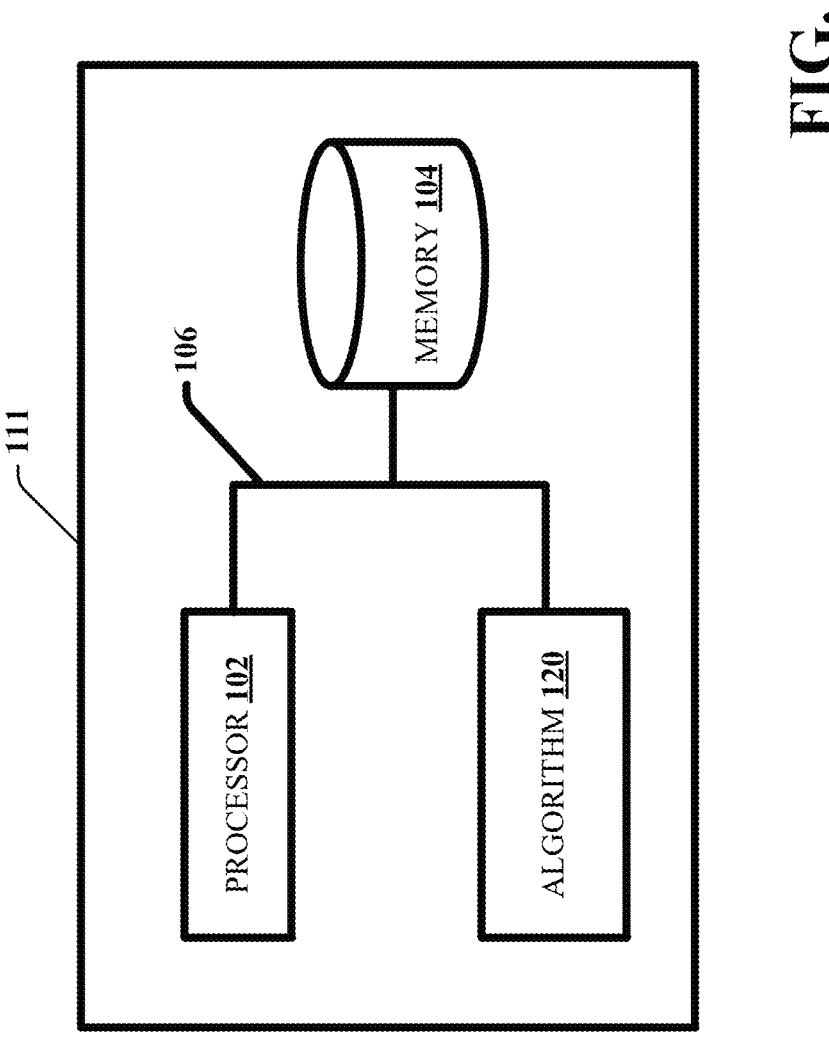
FIG. 1C illustrates a block diagram of an example, non-limiting system that can be employed to perform in-place updates of cache lines via non-cached stores in accordance with one or more embodiments described herein.
Figure 2A:
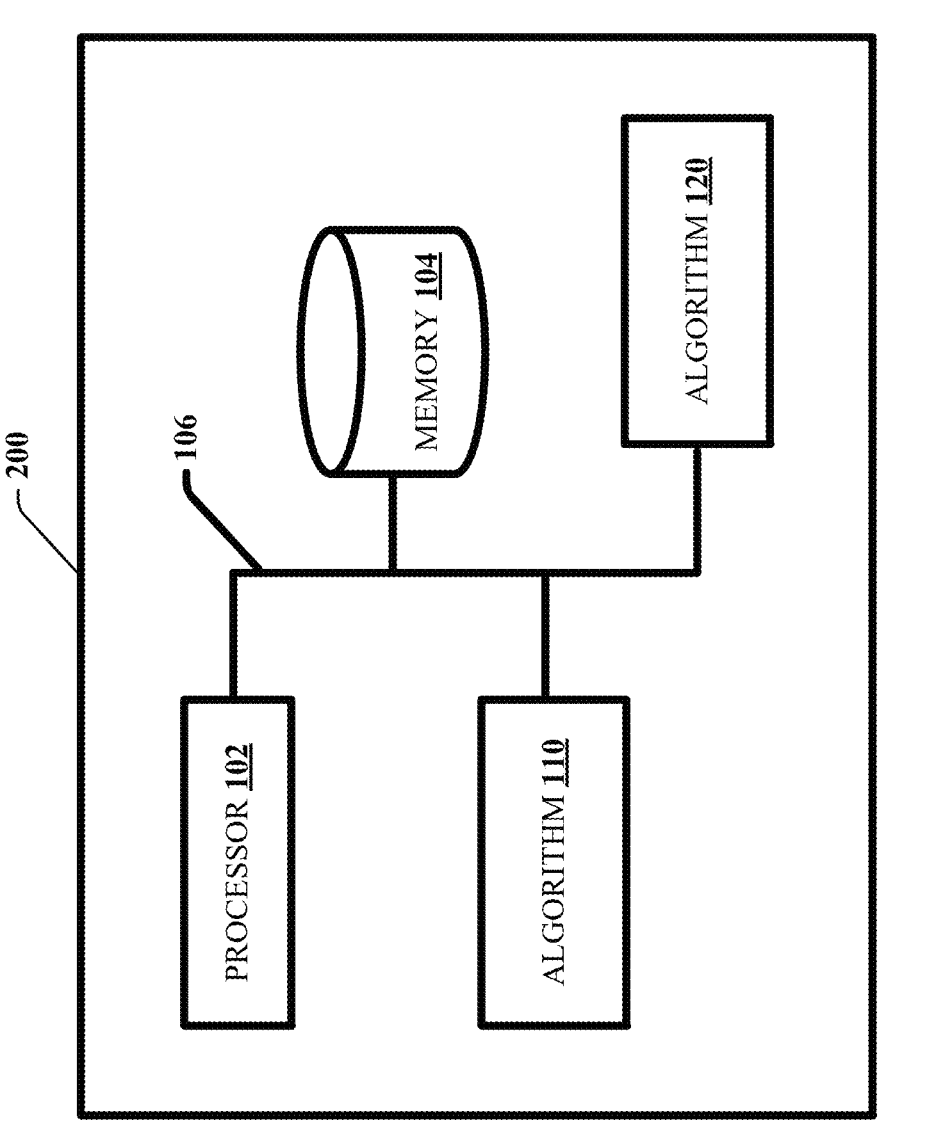
FIG. 2A illustrates a block diagram of an example, non-limiting system that can be employed for coherent communication between a processor core and an accelerator in accordance with one or more embodiments described herein.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1A, non-limiting system 111 as illustrated in FIG. 1C, non-limiting system 200 as illustrated in FIG. 2A, and/or systems thereof, can further comprise, be associated with and/or be coupled to one or more computer and/or computing-based elements described herein with reference to an operating environment, such as the operating environment 1000 illustrated at FIG. 10. For example, non-limiting system 200 can be associated with, such as accessible via, a computing environment 1000 described below with reference to FIG. 10, such that aspects of processing can be distributed between non-limiting system 200 and the computing environment 1000. In one or more described embodiments, computer and/or computing-based elements can be employed in connection with implementing one or more of the systems, devices, components and/or computer-implemented operations shown and/or described in connection with FIGS. 1A, 1C, 2A and/or with other figures described herein.

The one or more non-limiting systems illustrated in the figures and/or components of the one or more non-limiting systems can be employed to use hardware and/or software to solve problems that are highly technical in nature (e.g., related to computing systems, computer processing technologies, accelerators, etc.), that are not abstract and that cannot be performed as a set of mental acts by a human. Further, some of the processes performed may be performed by specialized computers for carrying out defined tasks related to in-place updates of cache lines for coherent communication between a processor core and an accelerator. Embodiments of the present disclosure can be employed to solve new problems that arise through advancements in technologies mentioned above, computing processes, and/or the like. Additionally, embodiments of the present disclosure can provide technical improvements to computing systems by preventing cache pollution, reducing the bandwidth utilized for computing operations, and increasing scalability within computing systems. For example, although direct wires between components can involve a reduced latency, the various embodiments herein can enable a processor core on one chip to access multiple accelerators on respective chips and further enable transmission of messages between multiple processor cores and accelerators without large latency impacts, as compared to existing systems that employ additional wires to connect individual chips.

Turning now to one or more figures, FIGS. 1A-1D illustrate diagrams of example, non-limiting systems and algorithms that can be employed for coherent communication between a processor core and an accelerator in accordance with one or more embodiments described herein.

Discussion turns briefly to processor 102, memory 104 and bus 106 illustrated in FIGS. 1A and 1C. In one or more embodiments, non-limiting system 100 and non-limiting system 111 can comprise processor 102 (e.g., computer processing unit, microprocessor, classical processor, and/or like processor). In one or more embodiments, a component associated with non-limiting system 100 and/or non-limiting system 111, as described herein with or without reference to the one or more figures of the one or more embodiments, can comprise one or more computer and/or machine readable, writable and/or executable components and/or instructions that can be executed by processor 102 to enable performance of one or more processes defined by such component(s) and/or instruction(s).

In one or more embodiments, non-limiting system 100 and non-limiting system 111 can comprise a computer-readable memory (e.g., memory 104) that can be operably connected to processor 102. Memory 104 can store computer-executable instructions that, upon execution by processor 102, can cause processor 102 and/or one or more other components of non-limiting system 100 and/or non-limiting system 111 (e.g., selection component 112, transmission component 114, monitoring component 116, inferencing component 118, tracking component 122, data generation component 124, storage component 126 and/or installation component 128) to perform one or more actions. In one or more embodiments, memory 104 can store computer-executable components (e.g., selection component 112, transmission component 114, monitoring component 116, inferencing component 118, tracking component 122, data generation component 124, storage component 126 and/or installation component 128).

Non-limiting system 100, non-limiting system 111 and/or a component thereof as described herein, can be communicatively, electrically, operatively, optically and/or otherwise coupled to one another via bus 106. Bus 106 can comprise one or more of a memory bus, memory controller, peripheral bus, external bus, local bus, and/or another type of bus that can employ one or more bus architectures. One or more of these examples of bus 106 can be employed. In one or more embodiments, non-limiting system 100 and/or non-limiting system 111 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of non-limiting system 100 and/or non-limiting system 111 can reside in the cloud, and/or can reside locally in a local computing environment (e.g., at a specified location(s)).

Figure 1B:
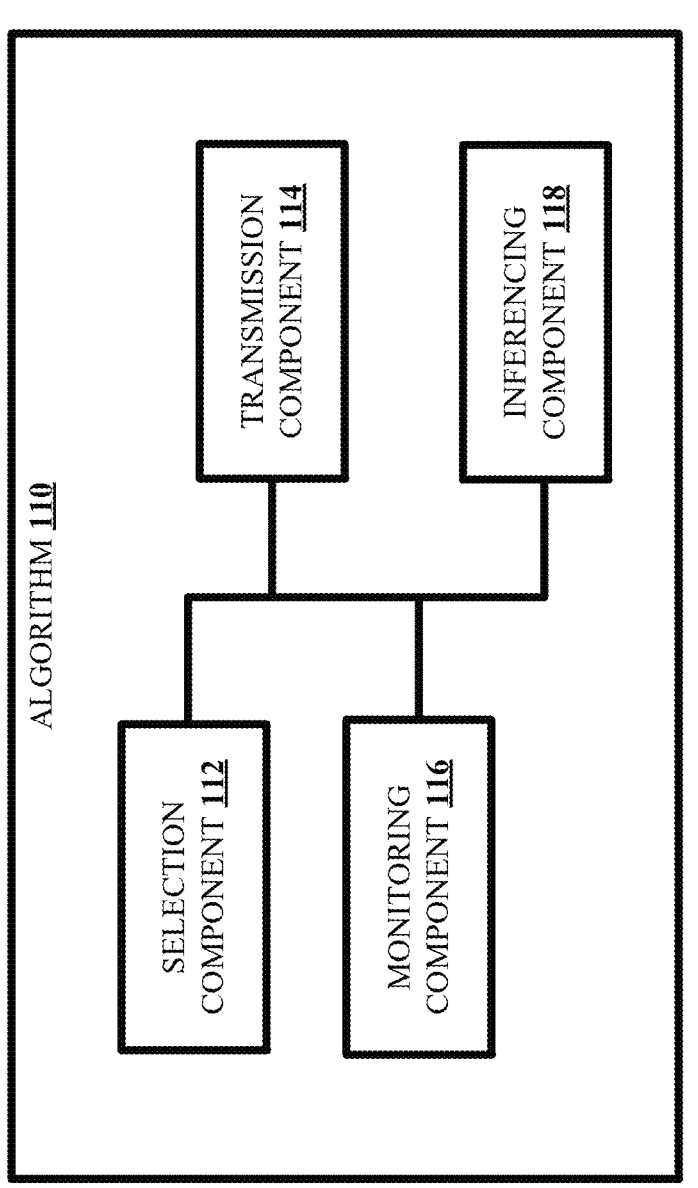
FIG. 1B illustrates a block diagram of an exemplary algorithm that can be employed by an example, non-limiting system to execute one or more functions for a program being executed by a processor core in accordance with one or more embodiments described herein.

FIG. 1A illustrates a block diagram of an example, non-limiting system 100 that can be employed to engage an accelerator to execute one or more functions for a program being executed by a processor core in accordance with one or more embodiments described herein, and FIG. 1B illustrates a block diagram of an algorithm that can be employed by the example, non-limiting system 100 to execute the one or more functions in accordance with one or more embodiments described herein.

For example, non-limiting system 100 can comprise algorithm 110, as illustrated in FIG. 1A. In one or more embodiments, algorithm 110 can comprise selection component 112, transmission component 114, monitoring component 116, and/or inferencing component 118, as illustrated in FIG. 1B. In one or more embodiments, algorithm 110 and one or more components of algorithm 110 can be employed to engage an accelerator to execute one or more functions for a program being executed by the processor core. For example, a processor core comprised in a first chip can be employed by an entity (e.g., hardware, software, neural network, AI, machine and/or user) to run a software, and the processor core can employ algorithm 110 to run the software or portions of the software. During execution of the software, algorithm 110 can encounter one or more functions that can be executed by an accelerator. As a result, selection component 112 can select and lock an accelerator located on the first chip or another chip to execute the one or more functions. Thereafter, transmission component 114 can transmit a start command to the accelerator, wherein the start command can comprise information about the one or more functions and an address associated with a cache comprised in the first chip. In one or more embodiments, transmission component 114 can transmit the start command to the accelerator via a sideband signaling mechanism and a signaling bus. The signaling bus can be a specially dedicated signaling bus. In an implementation, the signaling bus can also be a virtual bus that can employ an existing communication bus and that can be embedded as payload over the existing communication bus. Upon receiving the start command from the processor core, the accelerator can begin executing the one or more functions, and periodically install one or more messages in the cache to communicate a running state (e.g., internal status or internal state) of the accelerator to the processor core. In one or more embodiments, monitoring component 116 can monitor the running state of the accelerator based on the one or more messages. Based on the running state, inferencing component 118 can determine a phase of the one or more functions being executed by the accelerator and of the program being executed by the processor core. Upon determining the phase, inferencing component 118 can further determine whether the accelerator has completed the execution of the one or more functions. In one or more embodiments, the processor core can perform additional operations (e.g., read operations, updated operations, etc.) based on the one or more messages accessed by monitoring component 116 from the cache.

Figure 1D:
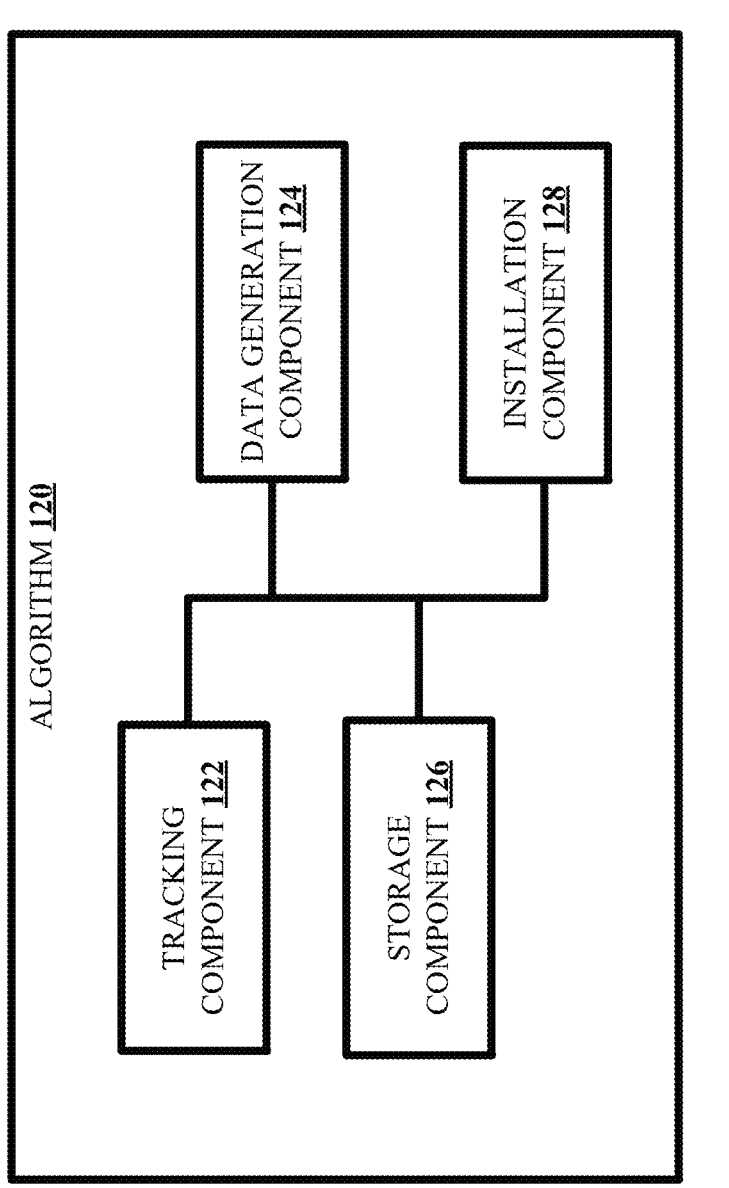
FIG. 1D illustrates a block diagram of an exemplary algorithm that can be employed by an example, non-limiting system to perform in-place updates of cache lines via non-cached stores in accordance with one or more embodiments described herein.

In one or more embodiments, the accelerator can generate and install the one or more messages in the cache comprised on the first chip via non-cached stores to update cache lines comprised in the cache. In this regard, FIG. 1C illustrates a block diagram of an example, non-limiting system 111 that can be employed for in-place updates of cache lines via non-cached stores in accordance with one or more embodiments described herein, and FIG. 1D illustrates a block diagram of an algorithm that can be employed by the example, non-limiting system 111 to perform the in-place updates of cache lines via non-cached stores in accordance with one or more embodiments described herein.

For example, non-limiting system 111 can comprise algorithm 120, as illustrated in FIG. 1C. In one or more embodiments, algorithm 120 can comprise tracking component 122, data generation component 124, storage component 126, and/or installation component 128, as illustrated in FIG. 1D. In one or more embodiments, algorithm 120 can be employed to perform in-place updates of cache lines for coherent communication between an accelerator and a processor core. For example, in one or more embodiments, an accelerator can be engaged to execute one or more functions as part of a software being executed by a processor core. In one or more embodiments, tracking component 122 can access data generated by the accelerator during execution of the one or more functions, and tracking component 122 can track, based on the data, a running state of the accelerator. Upon a determination by tracking component 122 that there is a change in the running state of the accelerator, data generation component 124 can generate a data packet comprising information about the running state of the accelerator and further comprising a store request for the data packet. Based on the store request, storage component 126 can store the data packet as a status line in a store request and data buffer. Thereafter, installation component 128 can transmit the data packet to the processor core as a message via a cache interface control protocol. Installation component 128 can install the message in a cache accessible to the processor core and the accelerator via a non-cached store. In one or more embodiments, installing the messages in the cache can update a cache line comprised in the cache. Algorithm 120 can enable the accelerator to communicate the running state of the accelerator to the processor core via existing connections (e.g., bus architectures, etc.) between the accelerator and the processor core and without employing additional wires.

Figure 2B:
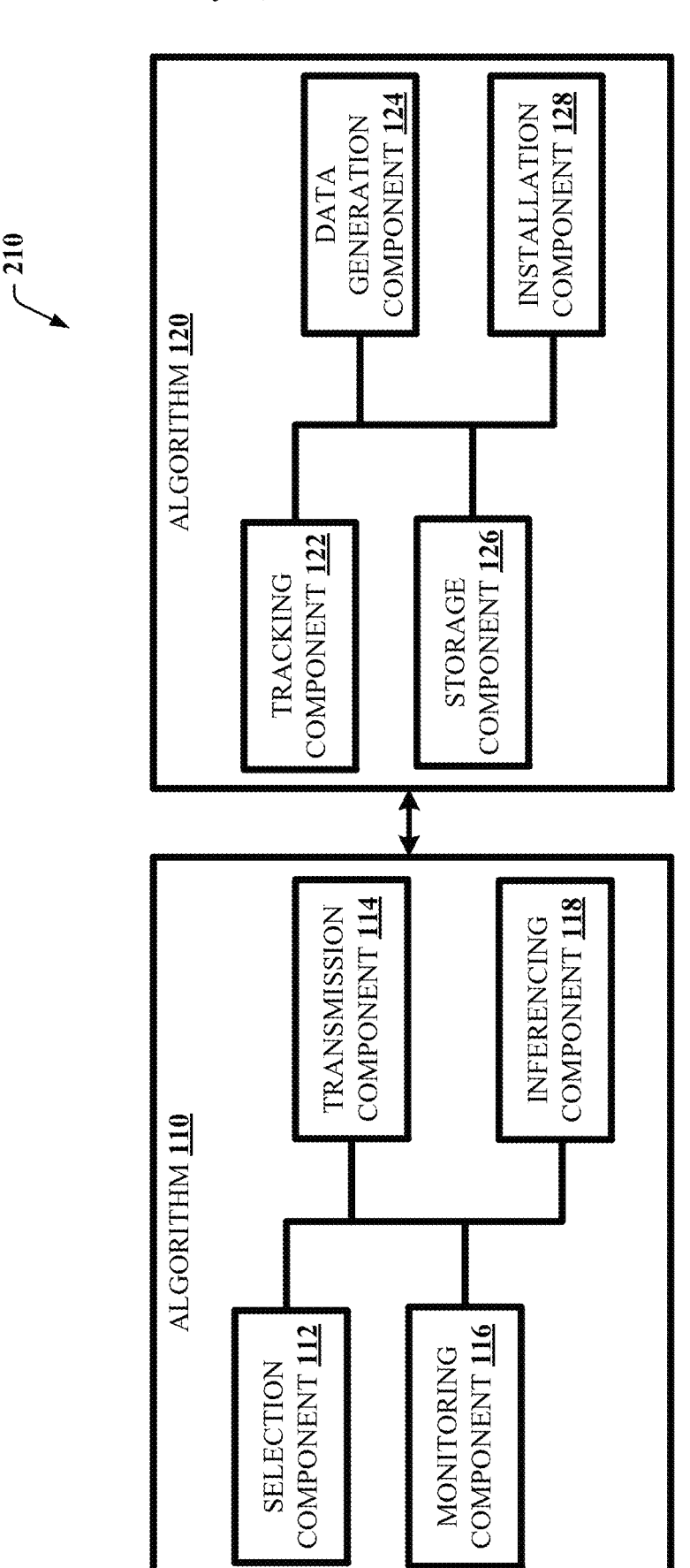
FIG. 2B illustrates a block diagram of an example, non-limiting system of algorithms that can be employed for coherent communication between a processor core and an accelerator in accordance with one or more embodiments described herein.

Turning next to FIGS. 2A-4, and first to FIGS. 2A and 2B, FIG. 2A illustrates a block diagram of an example, non-limiting system 200 that can be employed for coherent communication between a processor core and an accelerator in accordance with one or more embodiments described herein, and FIG. 2B illustrates a block diagram of an example, non-limiting system 200 of algorithms that can be employed for the coherent communication between the processor core and the accelerator in accordance with one or more embodiments described herein.

With continued reference to FIGS. 1A-1D, non-limiting system 200 illustrates a combination of non-limiting system 100 and non-limiting system 111, wherein non-limiting system 200 can comprise processor 102, memory 104, bus 106 algorithm 110 and algorithm 120. In one or more embodiments, algorithm 110 can interact with algorithm 120 to enable communication and transfer of data between a processor core and an accelerator to execute a program via the processor core. In this regard, non-limiting system 210 illustrates the system of algorithm 110 and algorithm 120 that can be employed for the communication and the transfer of data between the processor core and the accelerator.

Figure 3:
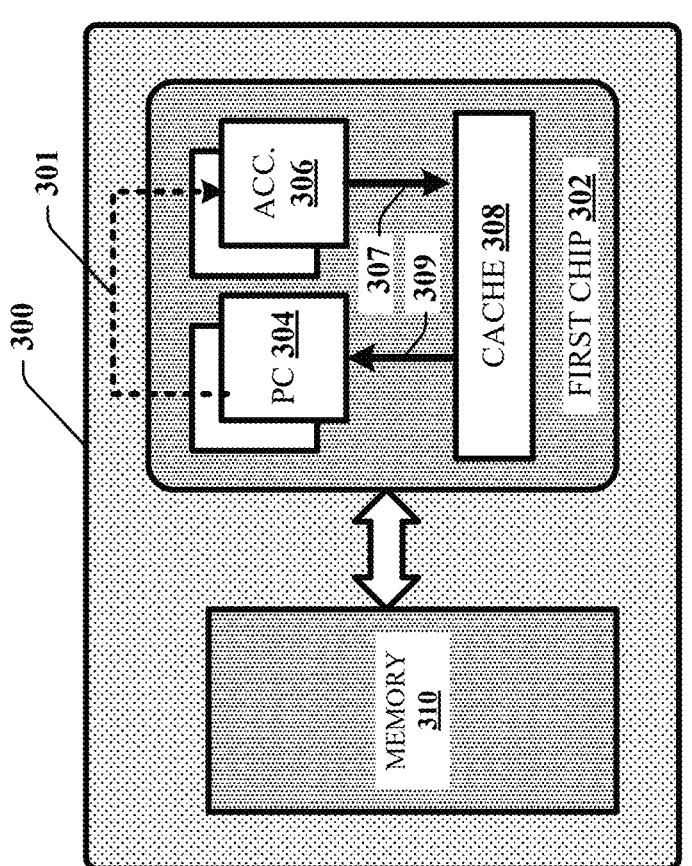
FIG. 3 illustrates a block diagram of an example, non-limiting system that can perform in-place updates of cache lines for coherent communication between a processor core and an accelerator in accordance with one or more embodiments described herein.
Figure 4:
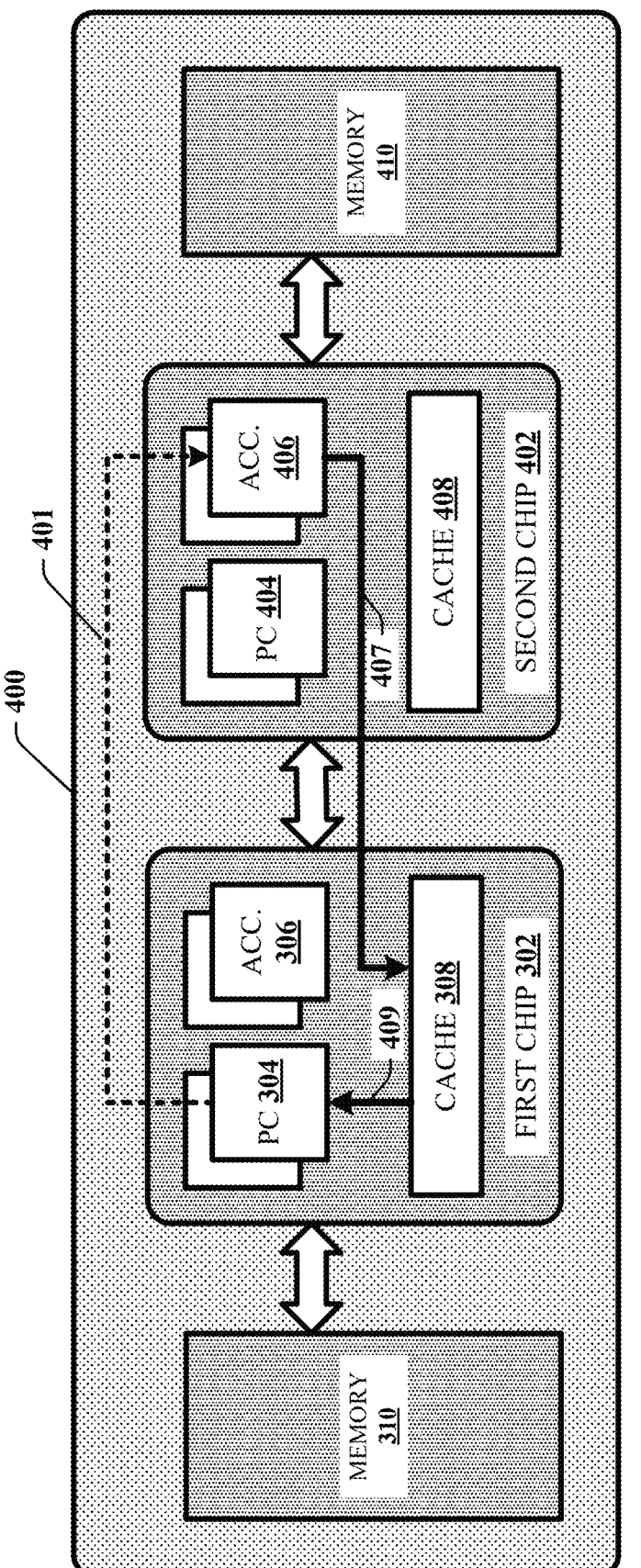
FIG. 4 illustrates a block diagram of another example, non-limiting system that can perform in-place updates of cache lines for coherent communication between a processor core and an accelerator in accordance with one or more embodiments described herein.

For example, in one or more embodiments, non-limiting system 300 illustrated in FIG. 3 and non-limiting system 400 illustrated in FIG. 4 can represent standard computing systems, wherein first chip 302, second chip 402 and/or one or more additional chips (not illustrated) can be part of a single computer processing unit such as a CPU. For example, in some embodiments, first chip 302, second chip 402 and/or one or more additional chips can be part of processor 102 (e.g., a CPU or other type of processor), whereas in other embodiments, first chip 302, second chip 402 and/or one or more additional chips can be part of a different processor (e.g., a CPU or other type of processor) that can access non-limiting system 200. Additionally, memory 310, memory 410 and/or any additional memories illustrated in non-limiting system 300 and/or non-limiting system 400 can be physically different memories. In one or more embodiments, memory 310, memory 410 and/or any additional memories can reside in a single memory space that can be cached by a cache hierarchy employed by the accelerator to perform in-place updates of cache lines in a cache (e.g., cache 308, cache 408, or another cache). For example, in an embodiment, the different respective memories (e.g., memory 310, memory 410 and/or any additional memories) can be part of memory 104, whereas in another embodiment, the different respective memories can be part of a different memory that can access non-limiting system 100. In one or more embodiments, algorithm 110 can be stored on each of the different respective memories operatively coupled (e.g., via a bus or another architecture) to respective chips. Similarly, in one or more embodiments, algorithm 120 can be stored on each of the different respective memories operatively coupled (e.g., via a bus or another architecture) to respective chips.

In one or more embodiments, non-limiting system 200 can employ algorithm 110 and algorithm 120 to engage an accelerator to execute one or more functions and to perform in-place updates of cache lines for coherent communication between a processor core (e.g., processor core 304 of FIG. 3, processor core 404 of FIG. 4, etc.) and an accelerator (e.g., accelerator 306 of FIG. 3, accelerator 406 of FIG. 4, etc.) as part of a program being executed by the processor core. For example, processor core 304 can be employed by an entity (e.g., hardware, software, neural network, AI, machine and/ or user) to run one or more programs (e.g., a single program, a software, etc.), and processor core 304 can employ algorithm 110 and algorithm 120 to execute and manage the execution of the one or more programs. During execution of the one or more programs, algorithm 110 can encounter a function that can be executed by an accelerator. For example, a software being executed by processor core 304 can call upon instructions that can indicate to algorithm 110 that the function should be executed by an accelerator. As a result, selection component 112 can select an accelerator and acquire a lock for the accelerator via processor core 304. Stated differently, processor core 304 can arrive a point or stage of execution of the software when an accelerator can be employed to accelerate the execution of one or more functions or operations related to the software, and selection component 112 can engage the accelerator, via processor core 304, to start an accelerated operation.

In one or more embodiments, after locking the accelerator, transmission component 114 can transmit a start command from processor core 304 to the accelerator, wherein the start command can comprise an address associated with cache 308 comprised in first chip 302. The process of transmitting the address from processor core 304 to the accelerator is illustrated in FIG. 3 at 301 and in FIG. 4 at 401. Transmitting the address of cache 308 to the accelerator can inform the accelerator about the location (e.g., cache 308) where the accelerator can store data to communicate information to processor core 304. The start command can further comprise information about a task to be executed by the accelerator for the one or more programs being executed by processor core 304. For example, in addition to the address of cache 308, the start command can comprise information about one or more functions to be executed by the accelerator as part of a software being executed on processor core 304. In this regard, algorithm 110 can provide the data, cache addresses, etc. to the accelerator via the start command to allow the accelerator to execute the one or more functions. The start command can be transmitted via a specially dedicated signaling bus coupling processor core 304 to the accelerator as opposed to cache 308. In an implementation, the signaling bus can also be a virtual bus that can employ an existing communication bus (e.g., at 301 or 401) and that can be embedded as payload over the existing communication bus. Further, the start command can be transmitted via a sideband signaling mechanism.

Upon receiving the start command from processor core 304, the accelerator can begin executing the one or more functions for the software being executed by processor core 304. During execution of the one or more functions, algorithm 120 can periodically install, via the accelerator, one or more messages in cache 308 to communicate a running state of the accelerator to processor core 304. For example, the one or more functions executed by the accelerator can involve a large operation that can be split into smaller blocks or phases. In one or more embodiments, algorithm 120 can trigger an update of an existing cache line in cache 308 via a non-cached store when the accelerator reaches a certain point in the phase handling.

More specifically, tracking component 122 can access data generated by the accelerator, during execution of the one or more functions, to track the running state of the accelerator. Upon a determination that there is a change in the running state of the accelerator, data generation component 124 can generate a data packet comprising information about the running state of the accelerator and further comprising a store request for the data packet. Storage component 126 can store the data packet as a status line in a store request and data buffer. After storage of the data packet in the store request and data buffer, installation component 128 can transmit the data packet from the accelerator to cache 308 to update a cache line comprised in cache 308. Installation component 128 can transmit the data packet as a message to cache 308 via a cache interface control protocol, and installation component 128 can install and store the message in cache 308 in a cache line (about 256 bytes) via a non-cached store. In one or more embodiments, installation component 128 can employ the address of cache 308, transmitted from processor core 304 to the accelerator, to identify the location (i.e., cache 308) to install the message. The process of installing the message in cache 308 is illustrated in FIG. 3 at 307 and in FIG. 4 at 407. Storing the message in cache 308 can update a cache line comprised in cache 308. In one or more embodiments, the accelerator can periodically store, via installation component 128, one or more messages into cache 308, and the one or more messages can be stored in cache 308 via non-cached stores to update respective cache lines.

The one or more messages installed in cache 308 are not intended to be processed in any particular order, and instead reflect the running state of the accelerator to processor core 304, at any given time. In this regard, the one or more messages installed in cache 308 can ensure that processor core 304 and the accelerator can remain synchronized regarding the one or more functions being executed by the accelerator at any given time in connection with the software being executed by processor core 304. For example, the one or more messages installed by installation component 128 in cache 308 can comprise information about an internal status or internal state of the accelerator. For example, the one or more messages can indicate whether the accelerator needs more data, the one or more messages can signal processor core 304 to transmit information about a source or target to the accelerator, the one or more messages can be a signal to processor core 304 indicating that the accelerator has recognized an error, and so on. Additionally, since algorithm 110 can manage the execution of the software on processor core 304, updates about the running state of the accelerator can assist algorithm 110 with knowledge about the phase of the operation being executed by the accelerator at any given time. This mechanism to synchronize processor core 304 and the accelerator is known as fine-grained interlocking.

In general, the one or more messages installed by installation component 128 in cache 308 can comprise a variety of status updates related to the accelerator, and algorithm 110 can access/call upon/fetch the information comprised in the one or more messages to check the status of the accelerator. For example, in one or more embodiments, monitoring component 116 can access or fetch the one or more messages stored in cache 308 via processor core 304, and monitoring component 116 can monitor the running state of the accelerator at cache 308, based on the one or more messages. The process of accessing the one or more messages from cache 308 is illustrated in FIG. 3 at 309 and in FIG. 4 at 409. Based on the monitoring, inferencing component 118 can determine whether the running state of the accelerator indicates an updated state of the accelerator as compared to a previously recorded running state of the accelerator, to determine a phase of a program being executed by processor core 304. Upon determining the phase, inferencing component 118 can further determine whether the accelerator has completed an operation (e.g., a function being executed by the accelerator). For example, inferencing component 118 can configure, via System Operations (SysOps), where the status line employed by the accelerator to communicate with processor core 304 is. In response to a determination by inferencing component 118 that the accelerator has completed the operation, selection component 112 can release a lock for the accelerator. In one or more embodiments, processor core 304 can perform additional operations (e.g., a read operation, an update operation, etc.) based on the one or more messages accessed by monitoring component 116 from cache 308.

In one or more embodiments, the accelerator can be an AI processing unit that can speed up the computation of AI workloads. In one or more embodiments, the accelerator can be located on first chip 302, on processor core 304 of first chip 302, or on second chip 402, wherein second chip 402 can be operatively coupled to first chip 302. For example, in an embodiment, the accelerator can be accelerator 306, wherein accelerator 306 can be located on first chip 302, as illustrated in FIG. 3, and wherein accelerator 306 can perform in-place updates of cache lines in cache 308. Although not illustrated, in some implementations, accelerator 306 can be an on-core accelerator, such as a matrix-multiplication engine that can be located on processor core 304. In another embodiment, the accelerator can be accelerator 406, wherein accelerator 406 can be located on second chip 402, as illustrated in FIG. 4, and wherein accelerator 406 can perform in-place updates of cache lines in cache 308. In yet another embodiment, the accelerator can be an accelerator on a non-illustrated third chip that is different from first chip 302 and second chip 402, and the accelerator can perform updates of cache lines in cache 308. Such updates are referred to as in-place updates throughout this specification to indicate that the updates are directly performed in a cache that is common to a processor core and accelerator, and the corresponding architecture is known as a triplet architecture, wherein the accelerator and processor core 304 (e.g., P chip) are on different chips, while being connected to the same cache (e.g., cache 308).

In general, the accelerator can be on first chip 302 or be external to first chip 302, while being operatively coupled to the same cache (e.g., cache 308) employed by processor core 304. In one or more embodiments, the accelerator can employ a cache hierarchy to communicate with cache 308. In this regard, cache 308 can be a Level 1 cache, a Level 2 cache or any other level of cache in the cache hierarchy. Additionally, cache 308 can be a chip cache, a core cache or any other type of cache, and cache 308 can store multiple cache lines.

As stated elsewhere herein, by installing the one or more messages as cache lines via non-cached stores in cache 308, installation component 128 can update cache 308, via the accelerator (e.g., accelerator 306, accelerator 406, or another accelerator), to communicate the running state of the accelerator to processor core 304. Such embodiments can prevent cache pollution, reduce the bandwidth consumed, and enable transmission of messages between processor core 304 and the accelerator without large latency impacts. For example, in the embodiments illustrated in FIG. 4, installation component 128 can update cache 308 to communicate a status of accelerator 406 without pulling the cache line from cache 308 (local cache for first chip 302) into cache 408 (local cache for second chip 402 and remote cache for first chip 302). That is, instead of updating cache 408, installation component 128 can update cache 308. Doing so can prevent cache pollution of cache 408 because installing the one or more messages that reflect the status of accelerator 406, in cache 408 instead of cache 308, can cause accelerator 406 to pull an existing cache line from cache 308 into cache 408 to store the one or more messages in cache 408, and further cause processor core 304 to pull the cache line from cache 408 back into cache 308 during a read process to access the one or more messages stored by the accelerator and read the status of accelerator 406. This is known as the "ping pong" effect, which can be undesirable because cache 408 can be polluted with unwanted data, for example, in situations where the second chip 402 is engaged to execute other tasks that employ cache 408.

Cache 408 can comprise a cache replacement so that the same location in either cache 308 or cache 408 can be employed to install the one or more messages. However, pulling a cache line from cache 408 to read or change the data in the cache line can indicate that every operation, update or read performed by processor core 304 based on the cache line can involve a missed latency, due to the delay resulting from accelerator 406 first pulling the cache line from cache 308 into cache 408, followed by processor core 304 pulling the cache line from cache 408 back into cache 308. On the contrary, since installation component 128 can directly install the one or more messages into cache 308 via non-cached stores, processor core 304 and accelerator 406 can operate based on the same amount of latency. As a result, any read operation performed by processor core 304 can have the same latency as that of accelerator 406. Further, minimal bandwidth can be employed to transmit data between first chip 302 and second chip 402 since existing buses/connections can be employed for communication from first chip 302 to second chip 402 and vice versa. For example, the communication from processor core 304 to accelerator 406 can occur via a dedicated signaling bus, whereas the communication from accelerator 406 to processor core 304 can occur via existing connections between first chip 302 and second chip 402, without employing direct wires between accelerator 406 and processor core 304. As a result, the various embodiments herein can reduce the amount of bandwidth utilized by the interaction between processor core 304 and accelerator 406, thereby increasing the bandwidth available for other operations within non-limiting system 400.

FIGS. 3 and 4 illustrate block diagrams of respective example, non-limiting systems 300 and 400 that can perform in-place updates of cache lines for coherent communication between a processor core and an accelerator in accordance with one or more embodiments described herein. Repetitive description of like elements and/or processes employed in respective embodiments is omitted for sake of brevity.

Various embodiments herein can employ the method of non-cached stores to install messages from an accelerator (e.g., an AI processing unit or another accelerator) located on one chip to a cache located on another chip without pulling the cache line from the chip comprising the cache to the chip comprising the accelerator, and the messages installed in the cache can indicate the status of the accelerator, information about whether the accelerator needs more data, etc. to a processor core located on the chip comprising the cache.

In one or more embodiments, non-limiting system 300 and/or non-limiting system 400 can illustrate standard computing systems, wherein first chip 302, second chip 402 and/or one or more additional chips can be part of a computer processing unit such as a CPU. For example, processor 102 of non-limiting system 200 can be a CPU. In an embodiment, first chip 302, second chip 402 and/or one or more additional chips can be part of processor 102, whereas in another embodiment, first chip 302, second chip 402 and/or one or more additional chips can be part of a different processor that can access non-limiting system 100.

With continued reference to the embodiments discussed with reference to FIGS. 1A-2B, non-limiting system 300 and non-limiting system 400 illustrate computing systems that can employ algorithm 110 to engage an accelerator (e.g., accelerator 306, accelerator 406 and/or another accelerator) to execute functions as part of a software being executed by a processor core (e.g., processor core 304, processor core 404 and/or another processor core) and employ algorithm 120 to periodically communicate the running state of the accelerator to the processor core. For example, processor core 304 can communicate with accelerator 306 and/or accelerator 406 via algorithm 110, and accelerator 306 and/or accelerator 406 can communicate with processor core 304 via algorithm 120. In this regard, in an embodiment, algorithm 110 and algorithm 120 can be stored in memory 310, memory 410 and/or another memory, wherein memory 310 can be accessible to processor core 304 and accelerator 306, memory 410 can be accessible to processor core 404 and accelerator 406, and so on. For example, memory 310 can be operatively coupled (e.g., via a bus or another architecture) to first chip 302 and memory 410 can be operatively coupled (e.g., via a bus or another architecture) to second chip 402, such that in non-limiting system 400, algorithm 110 can be accessible to processor core 304 via memory 310, and algorithm 120 can be accessible to accelerator 406 via memory 410.

In some embodiments, non-limiting system 400 can comprise one or more chips in addition to first chip 302 and/or second chip 402, wherein each chip can be operatively coupled (e.g., via a bus or another architecture) to a dedicated memory. In such embodiments, the processor core on a chip (e.g., first chip 302, second chip 402, and one or more additional chips) can engage (e.g., via algorithm 110) an accelerator on any chip to execute the one or more functions. Similarly, the accelerator on a chip (e.g., first chip 302, second chip 402, and one or more additional chips) can interact (e.g., via algorithm 120) with the processor core on the chip or on any other chip to communicate a running status of the accelerator to the processor core. Further, in such embodiments, algorithm 110 and/or algorithm 120 can be stored on each of the respective memories. In various embodiments, memory 310, memory 410 and/or any additional memories comprised in the system can be physically different memories. However, the different respective memories can reside in a single memory space that can be cached by the cache hierarchy employed by the accelerator. For example, in an embodiment, the different respective memories can be part of memory 104. In another embodiment, the different respective memories can be part of a different memory that can access non-limiting system 100.

Additionally, the processor core of a chip can interact with multiple accelerators via series interactions to execute one or more functions. For example, the different chips (illustrated and non-illustrated) in non-limiting system 400 can be interconnected via buses, and the processor core can interact with two or more accelerators via series interactions. For example, processor core 304 can engage accelerator 306 to execute a function, followed by engaging accelerator 406 to execute another function, and so on. The interaction between the processor core and the accelerator can occur via System Operations. Additionally, the interaction between the processor core and the accelerator can occur without any dedicated wires between the processor core and the accelerators, and the interaction between the processor core and the accelerator can be identical to that described with reference to FIG. 1, regardless of the chip where the accelerator is located.

For example, processor core 304 can employ algorithm 110 to execute a software, wherein selection component 112 of algorithm 110 can select accelerator 306 on first chip 302, accelerator 406 on second chip 402, or another accelerator on a different chip to execute one or more functions related to the software. Selection component 112 can acquire a lock for the selected accelerator after which transmission component 114 can transmit a start command to the accelerator via processor core 304. The start command can comprise the address of cache 308, information about the one or more functions to be executed by the accelerator, etc.

Upon receiving the start command, the accelerator can begin executing the one or more functions. Tracking component 122 can access data generated by the accelerator during execution of the one or more functions, and based on the data, tracking component 122 can track a running state of the accelerator. In response to a change detected by tracking component 122 in the running state of the accelerator, data generation component 124 can generate a data packet comprising information about the running state of the accelerator and further comprising a store request for the data packet. Based on the store request, storage component 126 can store the data packet as a status line in a store request and data buffer, and installation component 128 can install the data packet as a message in cache 308 to communicate a status of the accelerator to processor core 304. Installation component 128 can install the one or more messages in a cache line comprised in cache 308 via a non-cached store.

Monitoring component 116 can access the one or more messages stored in cache 308 via processor core 304, and monitoring component 116 can monitor the running state of the accelerator at cache 308, based on the one or more messages. Based on the monitoring, inferencing component 118 can determine whether the running state indicates an updated status of the accelerator as compared to a previously recorded running state of the accelerator to determine a phase of the software being executed by processor core 304. Upon determining the phase, inferencing component 118 can further determine whether the accelerator has finished executing the one or more functions. In response to a determination by inferencing component 118 that the accelerator has finished executing the one or more functions, selection component 112 can release a lock for the accelerator. Thereafter, processor core 304 can continue executing the software during which selection component 112 can select a different accelerator to execute one or more additional functions related to the software, and so on.

Figure 5:
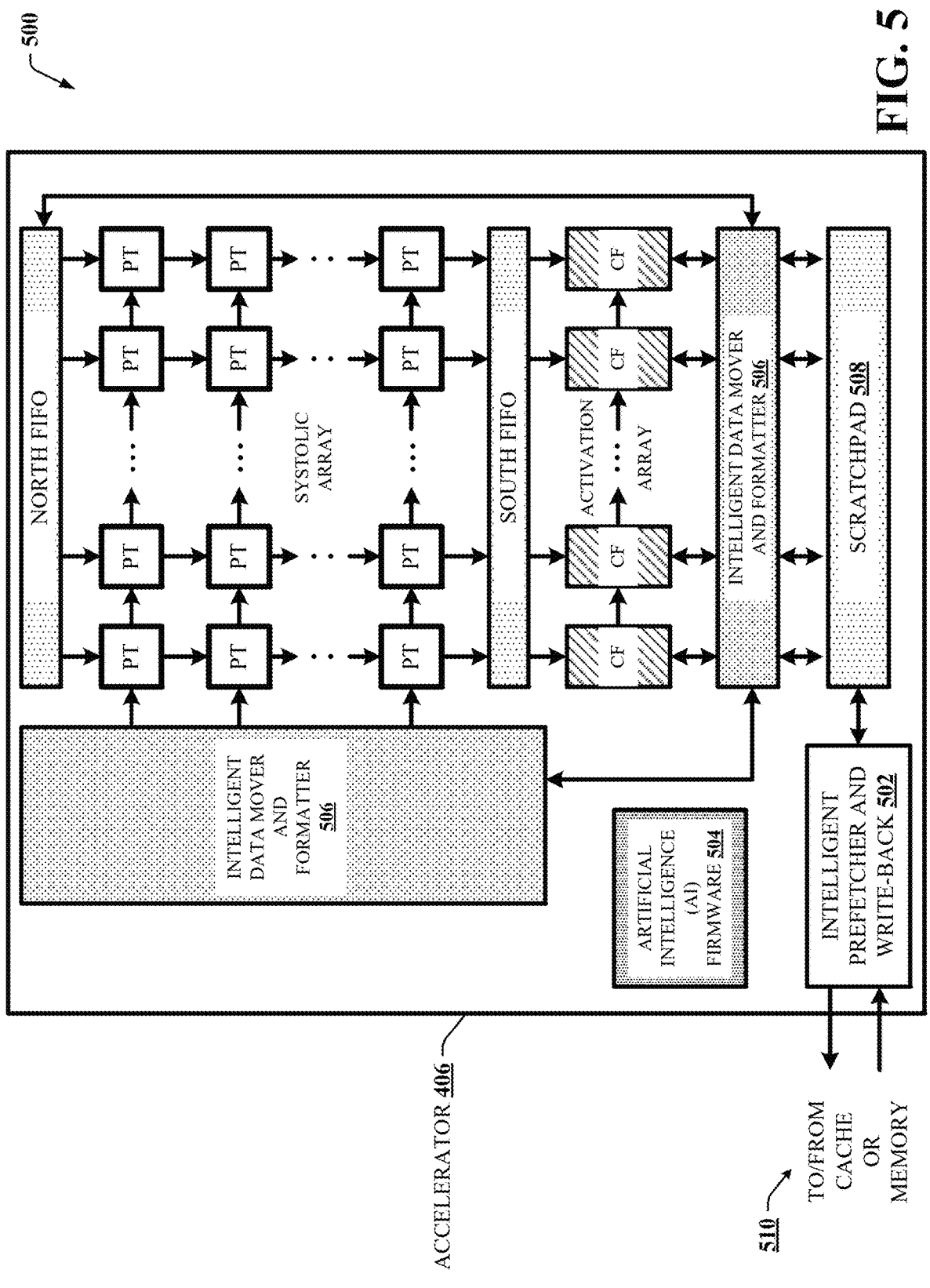
FIG. 5 illustrates a schematic of an example, non-limiting system of an accelerator that can communicate with a processor core by performing in-place updates of cache lines via non-cached stores in accordance with one or more embodiments described herein.

FIG. 5 illustrates a schematic of an example, non-limiting system 500 of an accelerator that can communicate with a processor core by performing in-place updates of cache lines via non-cached stores in accordance with one or more embodiments described herein. Repetitive description of like elements and/or processes employed in respective embodiments is omitted for sake of brevity.

Figure 6:
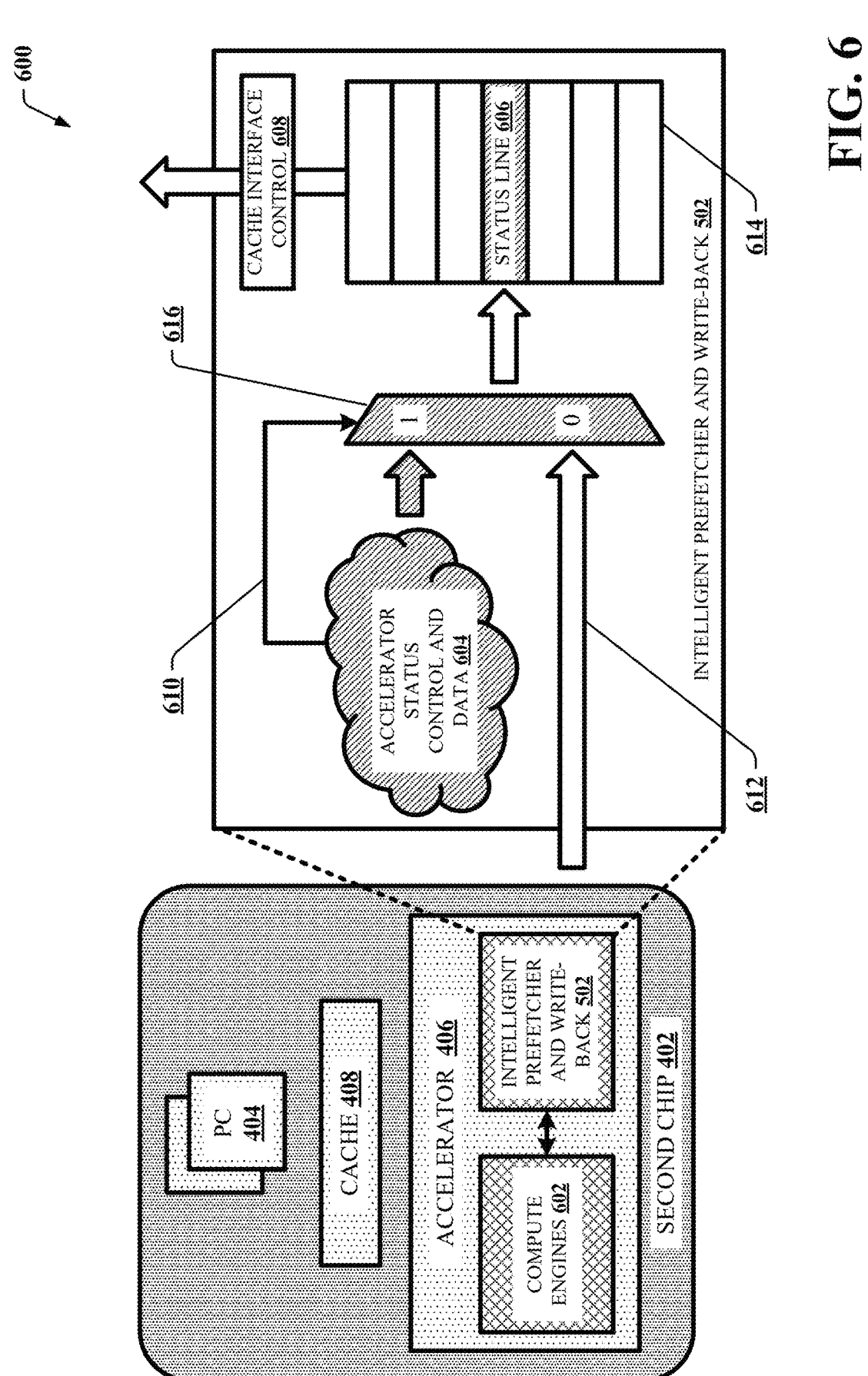
FIG. 6 illustrates a flow diagram of an example non-limiting process employed by an accelerator to communicate with a processor core by performing in-place updates of cache lines via non-cached stores in accordance with one or more embodiments described herein.

With continued reference to FIGS. 1A-4, non-limiting system 500 illustrates the system architecture of an accelerator (e.g., accelerator 306, accelerator 406, or another accelerator) that can interact with processor core 304 to execute one or more functions as part of a program (e.g., a software) being executed by processor core 304. It should be appreciated that FIGS. 5 and 6 illustrate accelerator 406 for simplicity of explanation; however, non-limiting system 500 can represent the system architecture of accelerator 306, accelerator 406, or any other accelerator that can communicate with processor core 304, processor core 404 or another processor core in accordance with the various embodiments of the present disclosure.

In one or more embodiments, non-limiting system 500 can comprise intelligent prefetcher and write-back 502, AI firmware 504, intelligent data mover and formatter 506, and scratchpad 508. In FIG. 5, "PT" stands for "processing tile,' "CF" stands for "complex functions," and 'FIFO" stands for "first in first out." AI firmware 504 can represent the firmware controlling the different engines (e.g., PT, CF) on accelerator 406, and AI firmware 504 can steer the operation that each engine shall perform. AI firmware 504 firmware can be loaded into accelerator 406 during a startup phase. Intelligent data mover and formatter 506 can be responsible for the preparation of the data so that the data can be passed to the engines and stored into scratchpad 508. Scratchpad 508 can be an internal memory of accelerator 406, and scratchpad 508 can hold intermediate data needed for calculations.

As discussed in one or more embodiments, accelerator 406 can employ algorithm 120 to periodically install one or more messages in cache 308 to communicate a running state of accelerator 406 to processor core 304. In one or more embodiments, accelerator 406 can employ intelligent prefetcher and write-back 502 to install the one or more messages. For example, intelligent prefetcher and write-back 502 can access algorithm 120 to track (e.g., via tracking component 122) a current state or a running state of accelerator 406 and send (e.g., via installation component 128) fetch requests and store requests to a cache/memory such as cache 308. For example, tracking component 122 can track the running state of accelerator 406, and if there is a change in the running state of accelerator 406, data generation component 124 can generate a data packet comprising information about the running state of accelerator 406 and further comprising a store request for the data packet. Based on the store request, storage component 126 can store the data packet as a status line in a store request and data buffer. At 510, installation component 128 can transmit, via intelligent prefetcher and write-back 502, the data packet to processor core 304 through a cache interface such as cache 308, as discussed in one or more embodiments.

Through such data packets, accelerator 406 can communicate to processor core 304, information about forward progress made by accelerator 406 in relation to one or more functions being executed by accelerator 406, the amount of progress made by accelerator 406 with respect to a program being executed by processor core 304, whether accelerator 406 is waiting for commands from processor core 304, whether accelerator 406 has completed execution of the one or more functions, whether accelerator 406 has entered an error state, and so on. Thus, accelerator 406 employ algorithm 120 via intelligent prefetcher and write-back 502 to track the internal state of accelerator 406, create a special data packet comprising information about the internal state of accelerator 406 and send the data packet through an existing cache interface control protocol to communicate the internal state of accelerator 406 to processor core 304.

FIG. 6 illustrates a flow diagram of an example non-limiting process 600 employed by an accelerator to communicate with a processor core by performing in-place updates of cache lines via non-cached stores in accordance with one or more embodiments described herein. Repetitive description of like elements and/or processes employed in respective embodiments is omitted for sake of brevity.

FIG. 6 illustrates second chip 402 of FIG. 4. Second chip 402 can comprise processor core 404, accelerator 406 and cache 308. With continued reference to at least FIG. 5, non-limiting process 600 can be employed by algorithm 120 to track the internal state of accelerator 406, create a special data packet comprising information about the internal state of accelerator 406 and send the data packet through an existing cache interface control protocol to communicate the internal state of accelerator 406 to processor core 304, via intelligent prefetcher and write-back 502.

For example, in one or more embodiments, accelerator 406 can additionally comprise compute engines 602, wherein compute engines 602 can perform computations for accelerator 406. For example, compute engines 602 can represent the portion of accelerator 406 that can execute one or more functions as part of a program (e.g., a software) being executed by processor core 304. Intelligent prefetcher and write-back 502 can be operatively coupled to compute engines 602, and intelligent prefetcher and write-back 502 can access algorithm 120.

At 610, intelligent prefetcher and write-back 502 can access (e.g., via tracking component 122) data generated by compute engines 602 to track the running status of accelerator 406. The data generated by compute engines 602 is illustrated as accelerator status control and data 604. At 612, upon a determination that there is a change in the running state of accelerator 406, intelligent prefetcher and write-back 502 can generate (via data generation component 124) a data packet comprising information about the running state of accelerator 406 and further comprising a store request for the data packet. Thereafter, intelligent prefetcher and write-back 502 can store (e.g., via storage component 126), based on the store request, the data packet as status line 606 in store request and data buffer 614. Upon storage of the data packet, intelligent prefetcher and write-back 502 can transmit (e.g., via installation component 128) the data packet to processor core 304 via cache interface control 608, wherein installation component 128 can install the data packet as a message in cache 308 via a cache interface control protocol defined by cache interface control 608.

In FIG. 6, block 616 illustrated with the numerals "1" and "0" can be a multiplexer that can be controlled based on a signal that indicates whether the status of accelerator 406 is "written" or "data."

Figure 7:
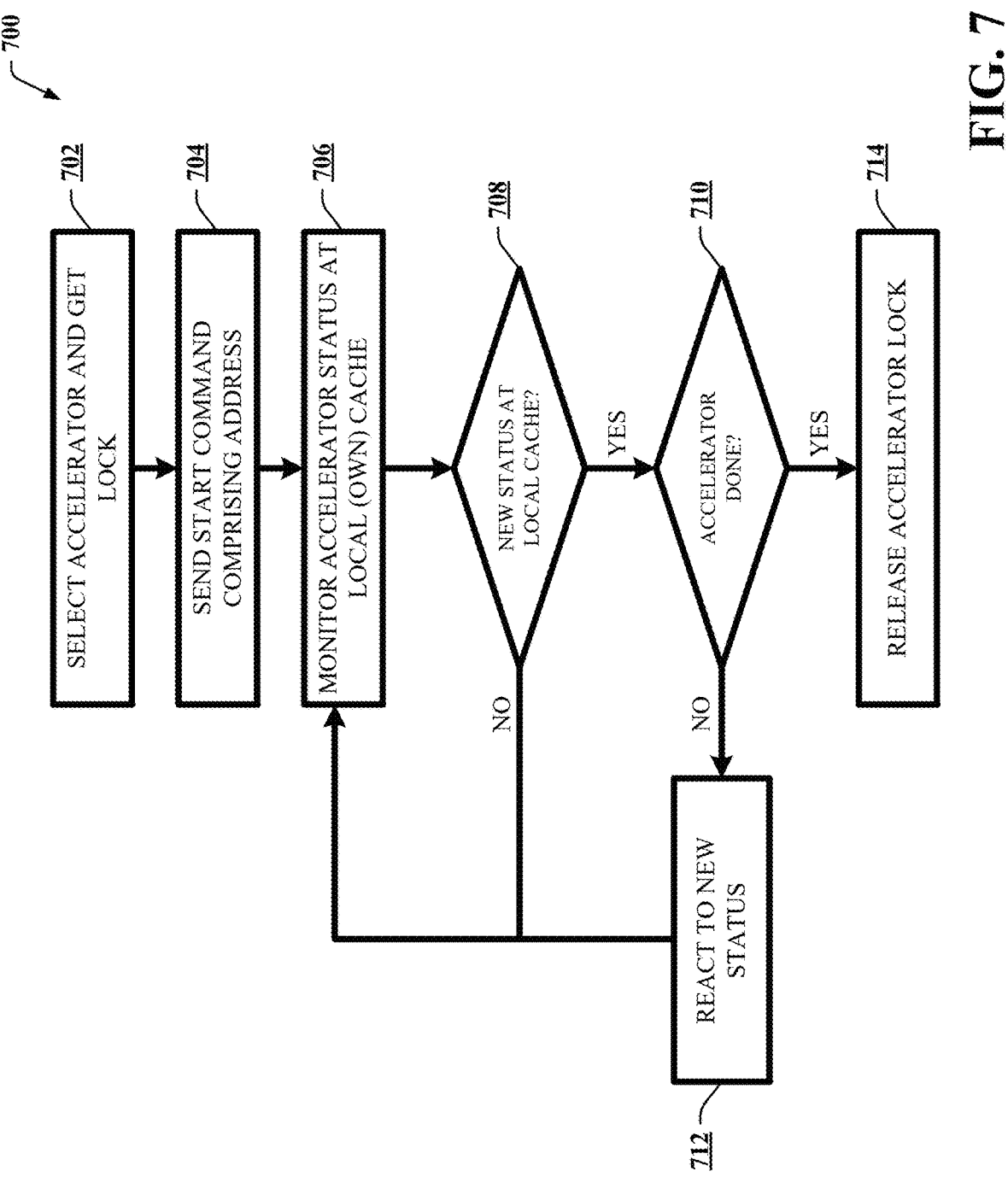
FIG. 7 illustrates a flow diagram of an example, non-limiting method employed by a processor core to interact with an accelerator in accordance with one or more embodiments described herein.

FIG. 7 illustrates a flow diagram of an example, non-limiting method 700 employed by a processor core to interact with an accelerator in accordance with one or more embodiments described herein. Repetitive description of like elements and/or processes employed in respective embodiments is omitted for sake of brevity.

With continued reference to FIGS. 1A-6, non-limiting method 700 illustrates the process employed by processor core 304 (or another core) to interact with an accelerator (e.g., accelerator 306, accelerator 406, or another accelerator) employed to execute one or more functions as part of a software being executed by processor core 304. Non-limiting method 700 corresponds to algorithm 110.

At 702 in non-limiting method 700, processor core 304 can select (e.g., via selection component 112) an accelerator and get a lock for the accelerator (i.e., lock the accelerator).

At 704 in non-limiting method 700, processor core 304 can transmit or send (e.g., via transmission component 114) a start command comprising the address of cache 308 to the accelerator.

At 706 in non-limiting method 700, processor core 304 can monitor (e.g., via monitoring component 116) the status (e.g., a running state) of the accelerator at cache 308 (i.e., at own cache or the local cache of processor core).

At 708 in non-limiting method 700, processor core 304 can determine (e.g., via inferencing component 118) whether cache 308 shows a new status or an updated status for the accelerator.

If cache 308 does not show a new status for the accelerator, then at 706 in non-limiting method 700, processor core 304 can return to monitoring (e.g., via monitoring component 116) the status of the accelerator at cache 308.

If cache 308 shows a new status for the accelerator, then at 710 in non-limiting method 700, processor core 304 can determine (e.g., via inferencing component 118) whether the accelerator has completed an operation (e.g., execution of one or more functions).

If the accelerator has not completed the operation, then at 712 in non-limiting method 700, processor core 304 can react to the new status of the accelerator. For example, processor core 304 can execute a read, update or other operation based on the new status of the accelerator. Thereafter, at 706 in non-limiting method 700, processor core 304 can return to monitoring (e.g., via monitoring component 116) the status of the accelerator at cache 308.

If the accelerator has completed the operation, then at 714 in non-limiting method 700, processor core 304 can release (e.g., via selection component 112), the accelerator lock.

Figure 8:
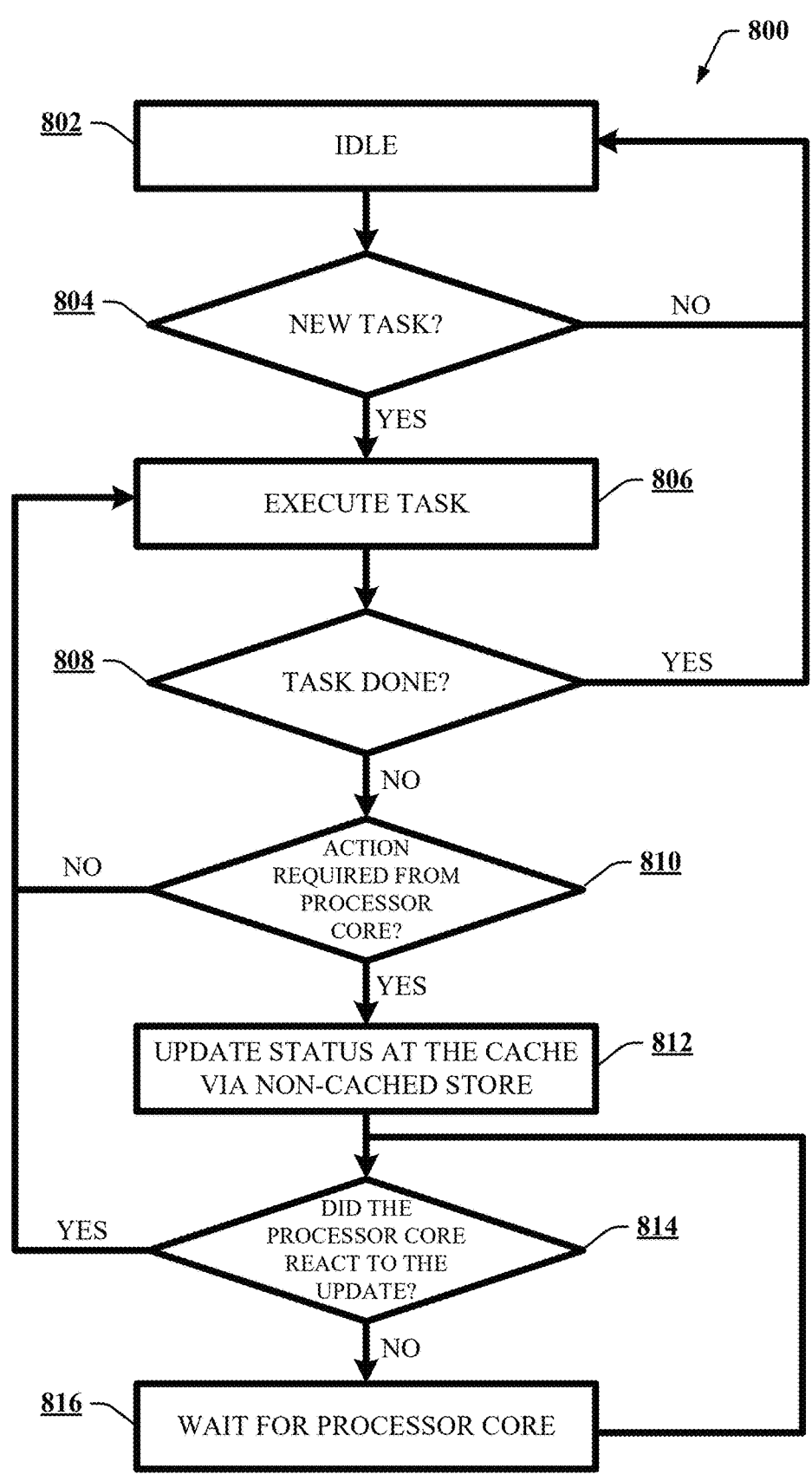
FIG. 8 illustrates a flow diagram of an example, non-limiting method employed by an accelerator to interact with a processor core in accordance with one or more embodiments described herein.

FIG. 8 illustrates a flow diagram of an example, non-limiting method 800 employed by an accelerator to interact with a processor core in accordance with one or more embodiments described herein. Repetitive description of like elements and/or processes employed in respective embodiments is omitted for sake of brevity.

With continued reference to FIGS. 1A-7, non-limiting method 800 illustrates the process employed by an accelerator (e.g., accelerator 306, accelerator 406, or another accelerator) to interact with processor core 304 to perform in-place updates of cache lines via non-cached stores. Non-limiting method 800 corresponds to algorithm 120.

At 802 in non-limiting method 800, the accelerator can remain idle (i.e., not engaged to execute any operation).

At 804 in non-limiting method 800, the accelerator can determine (e.g., via tracking component 122) whether the accelerator has been assigned a new task.

If the accelerator has been assigned a new task (e.g., by selection component 112 of algorithm 110 engaging the accelerator to execute one or more functions), the accelerator can begin executing the new task at 806 in non-limiting method 800.

If the accelerator has not been assigned a new task, then at 802 in non-limiting method 800, the accelerator can return to remaining idle.

At 808 in non-limiting method 800, the accelerator can determine (e.g., via tracking component 122) whether the task has been completed.

If the task has been completed by the accelerator, then at 802 in non-limiting method 800, the accelerator can return to remaining idle.

If the task has not been completed by the accelerator, then at 810 in non-limiting method 800, the accelerator can determine (e.g., via tracking component 122) whether any action is to be executed by processor core 304.

If any action is to be executed by processor core 304, then at 812 in non-limiting method 800, the accelerator can update (e.g., via installation component 128), the status (e.g., running state) of the accelerator at cache 308 via a non-cached store.

If no action is to be executed by processor core 304, the accelerator can return to 806 in non-limiting method 800 and continue to execute the task.

In an embodiment, after updating the running state of the accelerator at cache 308, the accelerator can determine (e.g., via tracking component 122), at 814 in non-limiting method 800, whether processor core 304 has reacted to the new status or updated status of the accelerator.

If processor core 304 has reacted to the new status of the accelerator, the accelerator can return to 806 in non-limiting method 800 to execute another task.

If processor core 304 has not reacted to the updated status of the accelerator, then at 816 in non-limiting method 800, the accelerator can wait for processor core 304 to react to the updated status of the accelerator.

In another embodiment, after updating the status of the accelerator at cache 308, the accelerator can directly proceed to 816 in non-limiting method 800 and wait for processor core 304 to react.

Figure 9A:
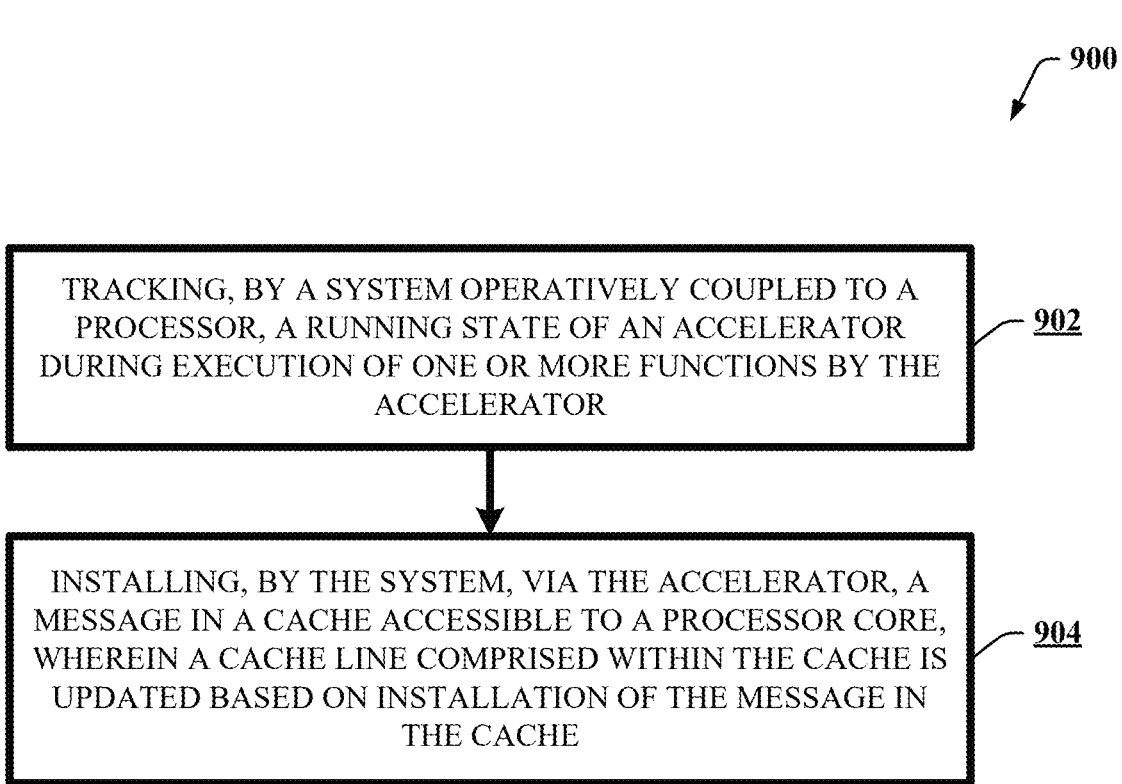
FIG. 9A illustrates a flow diagram of an example, non-limiting method that can be employed for coherent communication between a processor core and an accelerator in accordance with one or more embodiments described herein.

FIG. 9A illustrates a flow diagram of an example, non-limiting method 900 that can be employed for coherent communication between a processor core and an accelerator in accordance with one or more embodiments described herein. Repetitive description of like elements and/or processes employed in respective embodiments is omitted for sake of brevity.

At 902, the non-limiting method 900 can comprise tracking (e.g., by tracking component 122), by a system operatively coupled to a processor, a running state of an accelerator during execution of one or more functions by the accelerator.

At 904, the non-limiting method 900 can comprise installing (e.g., installation component 128), by the system, via the accelerator, a message in a cache accessible to a processor core, wherein a cache line comprised within the cache is updated based on installation of the message in the cache.

FIG. 9B illustrates a flow diagram of an example, non-limiting method 910 that can be employed for coherent communication between a processor core and an accelerator in accordance with one or more embodiments described herein. Repetitive description of like elements and/or processes employed in respective embodiments is omitted for sake of brevity.

At 912, the non-limiting method 910 can comprise selecting (e.g., by selection component 112), by a system operatively coupled to a processor, an accelerator to execute one or more functions related to a program being executed by a processor core At 914, the non-limiting method 910 can comprise transmitting (e.g., transmission component 114), by the system, an address associated with a cache to the accelerator, wherein the address is transmitted within a start command from the processor core to the accelerator via a signaling bus that is directly connected between the processor core and the accelerator.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, computer architecture and/or another technology.

Figure 10:
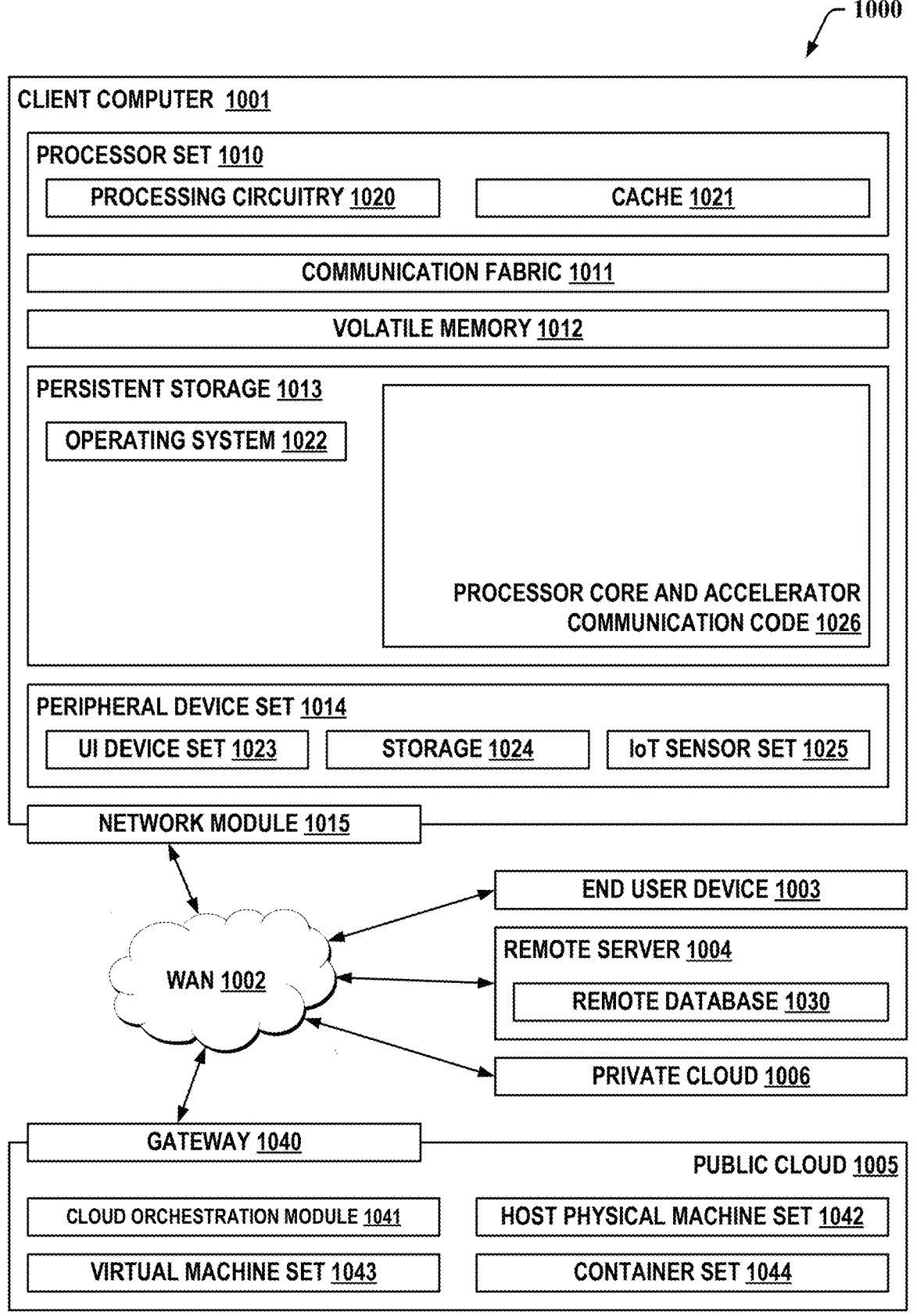
FIG. 10 illustrates a block diagram of an example, non-limiting operating environment in which one or more embodiments described herein can be facilitated.

FIG. 10 illustrates a block diagram of an example, non-limiting, operating environment in which one or more embodiments described herein can be facilitated. FIG. 10 and the following discussion are intended to provide a general description of a suitable operating environment 1000 in which one or more embodiments described herein at FIGS. 1-9 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 contains an example of an environment for the execution of at least some of the computer code involved in performing the inventive methods, such as processor core and accelerator communication code 1026. In addition to block 1026, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1026, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1026 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1026 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components;
a signaling bus that is directly connected between a processor core and an accelerator; and
a processor that executes the computer executable components stored in the memory, wherein the computer executable components comprise:
a selection component that selects the accelerator to execute one or more functions related to a program being executed by the processor core; and
a transmission component that transmits an address associated with a cache to the accelerator, wherein the address is transmitted within a start command from the processor core to the accelerator via the signaling bus, wherein the cache is accessible to both the processor core and the accelerator, and wherein the address is employable by the accelerator to install one or more messages in the cache via non-cached stores to communicate a running state of the accelerator to the processor core during execution of the one or more functions.

2. The system of claim 1, wherein the start command is transmitted from the processor core to the accelerator via a sideband signaling mechanism.

3. The system of claim 2, wherein the start command also comprises information about the one or more functions to be executed by the accelerator.

4. The system of claim 1, wherein the processor core is located on a first chip, and wherein the accelerator is located on the first chip, on the processor core, or on a second chip that is operatively coupled to the first chip.

5. The system of claim 1, wherein the accelerator is an artificial intelligence (AI) processing unit.

6. The system of claim 1, further comprising:
a monitoring component that:
accesses the one or more messages; and
monitors the running state of the accelerator at the cache, based on the one or more messages.

7. The system of claim 6, further comprising:

an inferencing component that:

determines, based on the monitoring, whether the running state indicates an updated state of the accelerator as compared to a previously recorded running state of the accelerator;

determines, based on the running state, a phase of the program being executed by the processor core; and determines, based on the phase, whether the accelerator has completed execution of the one or more functions.

8. The system of claim 7, wherein the selection component acquires a lock for the accelerator after selecting the accelerator and releases the lock based on a determination that the accelerator has completed the execution of the one or more functions.

9. A computer-implemented method, comprising:

selecting, by a system operatively coupled to a processor, an accelerator to execute one or more functions related to a program being executed by a processor core; and transmitting, by the system, an address associated with a cache to the accelerator, wherein the address is transmitted within a start command from the processor core to the accelerator via a signaling bus that is directly connected between the processor core and the accelerator, wherein the cache is accessible to both the processor core and the accelerator, and wherein the address is employable by the accelerator to install one or more messages in the cache via non-cached stores to communicate a running state of the accelerator to the processor core during execution of the one or more functions.

10. The computer-implemented method of claim 9, wherein the start command is transmitted from the processor core to the accelerator via a sideband signaling mechanism.

11. The computer-implemented method of claim 10, wherein the start command also comprises information about the one or more functions to be executed by the accelerator.

12. The computer-implemented method of claim 9, wherein the processor core is located on a first chip, and wherein the accelerator is located on the first chip, on the processor core, or on a second chip that is operatively coupled to the first chip.

13. The computer-implemented method of claim 9, wherein the accelerator is an AI processing unit.

14. The computer-implemented method of claim 9, further comprising:

accessing, by the system, the one or more messages; and monitoring, by the system, the running state of the accelerator at the cache, based on the one or more messages.

15. The computer-implemented method of claim 14, further comprising:

determining, by the system, based on the monitoring, whether the running state indicates an updated state of the accelerator as compared to a previously recorded running state of the accelerator;

determining, by the system, based on the running state, a phase of the program being executed by the processor core; and determining, by the system, based on the phase, whether the accelerator has completed execution of the one or more functions.

16. The computer-implemented method of claim 15, further comprising:

acquiring, by the system, a lock for the accelerator after the selecting; and releasing, by the system, the lock based on a determination that the accelerator has completed the execution of the one or more functions.

17. A computer program product for communication between a processor core and an accelerator, the computer program product comprising a computer readable storage medium having program instructions embodied therewith, the program instructions executable by a processor to cause the processor to:

select, by the processor, the accelerator to execute one or more functions related to a program being executed by the processor core; and transmit, by the processor, an address associated with a cache to the accelerator, wherein the address is transmitted within a start command from the processor core to the accelerator via a signaling bus that is directly connected between the processor core and the accelerator, wherein the cache is accessible to both the processor core and the accelerator, and wherein the address is employable by the accelerator to install one or more messages in the cache via non-cached stores to communicate a running state of the accelerator to the processor core during execution of the one or more functions.

18. The computer program product of claim 17, wherein the start command is transmitted from the processor core to the accelerator via a sideband signaling mechanism.

* * * * *